United States Patent
Zhou et al.

(10) Patent No.: US 9,226,222 B2
(45) Date of Patent: Dec. 29, 2015

(54) CONGESTION/OVERLOAD CONTROL METHOD AND APPARATUS

(71) Applicant: Huawei Technologies Co., Ltd., Shenzhen, Guangdong (CN)

(72) Inventors: Han Zhou, Shanghai (CN); Wenfu Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 253 days.

(21) Appl. No.: 13/657,287

(22) Filed: Oct. 22, 2012

(65) Prior Publication Data

US 2013/0088956 A1 Apr. 11, 2013

Related U.S. Application Data

(63) Continuation of application No. PCT/CN2010/072051, filed on Apr. 22, 2010.

(51) Int. Cl.
*H04W 48/02* (2009.01)
*H04W 4/08* (2009.01)

(52) U.S. Cl.
CPC ............. *H04W 48/02* (2013.01); *H04W 4/08* (2013.01)

(58) Field of Classification Search
CPC ....... H04W 48/02; H04W 4/08; H04W 28/08; H04W 48/06
USPC ........................................................ 370/230
See application file for complete search history.

(56) References Cited

U.S. PATENT DOCUMENTS 7,137,144 B1 11/2006 Attwood et al.
2002/0173316 A1* 11/2002 Jang et al. ..................... 455/453

(Continued)

FOREIGN PATENT DOCUMENTS

CA 2598378 A1 2/2008
CN 101039263 A 9/2007

(Continued)

OTHER PUBLICATIONS

"MTC Charging Optimization," SA WG2 Temporary Document TD S2-101041, 3GPP TSG SA WG2 Meeting #78, Feb. 2010, San Francisco, USA, 3rd Generation Partnership Project, Valbonne, France.

(Continued)

*Primary Examiner* — Paul H Masur
*Assistant Examiner* — Kabir Jahangir
(74) *Attorney, Agent, or Firm* — Leydig, Voit & Mayer, Ltd.

(57) ABSTRACT

Embodiments of the present invention provide a congestion/overload control method and apparatus. The method includes: learning, by a gateway device, information about network access time of a User Equipment (UE) or UE group; and rejecting or discarding, by the gateway device, session management request messages of the UE or UEs in the UE group beyond the network access time of the UE or UE group; or discarding, by the gateway device, data of the UE or the UEs in the UE group beyond the network access time of the UE or UE group. Embodiments of the present invention can perform congestion/overload control differentially on the UE or UEs in the group, implement congestion/overload control on the gateway device, avoid congestion/overload caused by a large number of UEs on the gateway device, and improve the efficiency of congestion/overload control.

13 Claims, 5 Drawing Sheets

(56) References Cited

U.S. PATENT DOCUMENTS

| | | | |
|---|---|---|---|
| 2002/0186657 A1* | 12/2002 | Jain et al. .................. | 370/235 |
| 2004/0165529 A1* | 8/2004 | Lee ............................. | 370/230 |
| 2004/0176098 A1 | 9/2004 | Besset-Bathias et al. | |
| 2005/0226250 A1 | 10/2005 | Makayama et al. | |
| 2006/0028980 A1* | 2/2006 | Wright ....................... | 370/229 |
| 2006/0171350 A1* | 8/2006 | Taniguchi et al. .......... | 370/328 |
| 2006/0268702 A1* | 11/2006 | Ali et al. .................... | 370/230 |
| 2007/0121500 A1* | 5/2007 | McBride et al. ............ | 370/230 |
| 2008/0049741 A1* | 2/2008 | Wirtanen et al. ........... | 370/389 |
| 2008/0205268 A1* | 8/2008 | Imai ............................ | 370/230 |
| 2008/0219167 A1* | 9/2008 | Xu et al. ..................... | 370/237 |
| 2009/0197611 A1* | 8/2009 | Chin et al. .................. | 455/452.2 |
| 2010/0110887 A1* | 5/2010 | Beaujean et al. ........... | 370/230 |
| 2010/0149970 A1* | 6/2010 | Miranda et al. ............ | 370/229 |
| 2010/0169486 A1* | 7/2010 | McCormack et al. ...... | 709/226 |
| 2011/0026422 A1 | 2/2011 | Ma et al. | |
| 2011/0218004 A1* | 9/2011 | Catovic et al. ............. | 455/509 |
| 2011/0255410 A1* | 10/2011 | Yamen et al. ............... | 370/237 |
| 2014/0161072 A1 | 6/2014 | Przybysz et al. | |
| 2015/0036638 A1 | 2/2015 | Zisimopoulos | |

FOREIGN PATENT DOCUMENTS

| | | | |
|---|---|---|---|
| CN | 100344203 C | 10/2007 | |
| CN | 101056473 A | 10/2007 | |
| CN | 101174992 A | 5/2008 | |
| CN | 101305346 A | 11/2008 | |
| CN | 101459928 A | 6/2009 | |
| CN | 101540719 A | 9/2009 | |
| EP | 1906589 A1 * | 4/2008 | ............. H04L 29/06 |
| JP | H04003568 A | 1/1992 | |
| JP | 2003061141 A | 2/2003 | |
| JP | 2004535747 A | 11/2004 | |
| JP | 2005204103 A | 7/2005 | |
| JP | 200886001 A | 4/2008 | |
| JP | 2010537529 A | 12/2010 | |
| JP | 2011504311 A | 2/2011 | |
| WO | WO 03107611 A1 | 12/2003 | |
| WO | WO 2009049684 A1 | 4/2009 | |
| WO | WO 2009/096833 A1 | 8/2009 | |

OTHER PUBLICATIONS

Extended European Search Report in corresponding European Patent Application No. 10850046.3 (Sep. 10, 2013).

"3$^{rd}$ Generation Partnership Project; Technical Specification Group Services and System Aspects; System Improvements for Machine-Type Communications (Release 10)," 3GPP TR 23.888, V0.3.2, Mar. 2010, 3GPP, Valbonne, France.

"3$^{rd}$ Generation Partnership Project; Technical Specification Group Services and System Aspects; Service Requirements for Machine-Type Communications (MTC); Stage 1 (Release 10)," 3GPP TS 22.368, V10.0.0, Mar. 2010, 3GPP, Valbonne, France.

"Time Tolerant Optimization," 3GPP TSG SA WG2 Meeting #78, Feb. 22-26, 2010, 3GPP, Valbonne, France.

"Congestion Management in GPRS/EPC Core Network," 3GPP TSG SA WG2 Meeting #78, Feb. 22-26, 2010, 3GPP, Valbonne, France.

"Network Improvement for Group Based Policing," 3GPP TSG SA WG2 Meeting #77, Jan. 18-22, 2010, 3GPP, Valbonne, France.

International Search Report in corresponding International Patent Application No. PCT/CN2010/072051 (Jan. 27, 2011).

Written Opinion of the International Searching Authority in corresponding International Patent Application No. PCT/CN2010/072051 (Jan. 27, 2011).

"TS 23.401—3rd Generation Partnership Project; Technical Specification Group Services and System Aspects; General Packet Radio Service (GPRS) enhancements for Evolved Universal Terrestrial Radio Access Network (E-UTRAN) access (Release 9)," Technical Specification, Mar. 2010, V9.4.0, 3GPP, Valbonne, France.

* cited by examiner

CONGESTION/OVERLOAD CONTROL METHOD AND APPARATUS

CROSS-REFERENCE TO RELATED APPLICATIONS

This application is a continuation of International Patent Application No. PCT/CN2010/072051, filed on Apr. 22, 2010, which is hereby incorporated by reference in its entirety.

FIELD OF THE INVENTION

The present invention relates to the field of communication technologies, and in particular, to a congestion/overload control method and apparatus.

BACKGROUND OF THE INVENTION

In Machine Type Communications (Machine Type Communications, MTC) applications with a large number of User Equipments (User Equipments, UEs), multiple UEs (UEs of MTC applications) may constitute a whole, which is hereinafter referred to as a group or a UE group, so that network operators or MTC users may manage and control the group as a whole. When a large number of such UEs access the network, a mobility management element may be congested/overloaded, and therefore congestion/overload control is performed. The mobility management element may select one or several gateway devices for a group of UEs, that is, different UEs in the same group may be connected to one or several gateway devices through different mobility management elements. Therefore, the mobility management element may converge connectivity requests of the UEs in the group in the network to one or several gateway devices. Even if the mobility management element is not congested/overloaded, the gateway device may be congested/overloaded under the impact of a large amount of signaling.

In the process of implementing the present invention, the inventor finds at least the following problems in the prior art:

The mobility management element can perform congestion/overload control to control the access of the UE according to only its own state information, but cannot learn whether the gateway device is in the congested/overloaded state. Therefore, the mobility management element cannot perform congestion/overload control; as a result, the connectivity requests initiated by the subsequent UEs impact the gateway device, and the congestion/overload of the gateway device may get more serious. Consequently, the gateway device cannot work normally.

Further, if the mobility management element is in the congested/overloaded state, the mobility management element notifies an access network element to perform congestion/overload control, and the access network element does not differentiate UEs when performing congestion/overload control. In Machine to Machine (Machine to Machine, M2M) applications, because a lot of MTC users exist, service features of M2M applications of different MTC users are different. Therefore, the M2M applications of some specific MTC users cause network congestion/overload, for example, UEs of some MTC users initiate an access or detach procedure to the network frequently, resulting in network congestion or overload. Even if the network device can perform congestion/overload control on the gateway device, the network device cannot differentiate and control the UEs that cause congestion/overload of the gateway device, thereby reducing the efficiency of congestion/overload control.

SUMMARY OF THE INVENTION

Embodiments of the present invention provide a congestion/overload control method and apparatus, which can implement congestion/overload control on a gateway device, avoid congestion/overload caused by a large number of UEs on the gateway device, and improve the efficiency of congestion/overload control.

An embodiment of the present invention provides a congestion/overload control method, including:

learning, by a gateway device, information about network access time of a UE or UE group; and rejecting or discarding, by the gateway device, session management request messages of the UE or UEs in the UE group beyond the network access time of the UE or UE group; or discarding, by the gateway device, data of the UE or the UEs in the UE group beyond the network access time of the UE or UE group.

An embodiment of the present invention provides another congestion/overload control method, including:

learning, by a gateway device, information about a congestion/overload control parameter or policy of a UE group; and if the congestion/overload control parameter or policy of the UE group is reached or exceeded, rejecting or discarding, by the gateway device, session management request messages of UEs in the UE group, or discarding, by the gateway device, data of the UEs in the UE group, or deleting, by the gateway device, bearers or PDP contexts of the UEs in the UE group, or discarding, by the gateway device, data that exceeds the congestion/overload control parameter or policy of the UE group, or charging, by the gateway device, for the data that exceeds the congestion/overload control parameter or policy of the UE group.

An embodiment of the present invention provides still another congestion/overload control method, including:

receiving an indication message sent by a gateway device, where the indication message indicates that the gateway device is congested/overloaded or that an application server is failed/congested/overloaded/unreachable/misbehaving; and selecting other gateway devices for UEs that access the gateway device; or rejecting or discarding access request messages of UEs served by the gateway device or the application server; or detaching UEs on the gateway device or the application server; or deleting bearers of the UEs on the gateway device or the application server.

An embodiment of the present invention provides a gateway device, including:

a learning module, adapted to learn information about network access time of a UE or UE group; and a controlling module, adapted to: beyond the network access time of the UE or UE group, reject or discard session management request messages of the UE or UEs in the UE group, or discard data of the UE or the UEs in the UE group.

An embodiment of the present invention provides another gateway device, including:

a learning module, adapted to learn information about a congestion/overload control parameter or policy of a UE group; and a controlling module, adapted to: if the congestion/overload control parameter or policy of the UE group is reached or exceeded, reject or discard session management request messages of UEs in the UE group, or discard data of the UEs in the UE group, or delete bearers or PDP contexts of the UEs in the UE group, or discard data that exceeds the congestion/overload control parameter or policy of the UE group, or charge for the data that exceeds the congestion/overload control parameter or policy of the UE group.

An embodiment of the present invention provides still another gateway device, including a sending module adapted to send an indication message to a mobility management element, where the indication message indicates that the gateway device is congested/overloaded or that an application server is failed/congested/overloaded/unreachable/misbehaving, so that the mobility management element selects other gateway devices for UEs that access the gateway device, or rejects or discards access request messages of UEs served by the gateway device or the application server, or detaches UEs on the gateway device or the application server, or deletes bearers of the UEs on the gateway device or the application server.

An embodiment of the present invention provides a mobility management element, including:

a receiving module, adapted to receive an indication message sent by a gateway device, where the indication message indicates that the gateway device is congested/overloaded or that an application server is failed/congested/overloaded/unreachable/misbehaving; and a controlling module, adapted to: select other gateway devices for UEs that access the gateway device; or reject or discard access request messages of UEs served by the gateway device or the application server; or detach UEs on the gateway device or the application server; or delete bearers of the UEs on the gateway device or the application server.

As seen from the above technical solutions, by using the congestion/overload control method in the embodiments of the present invention, when the gateway device is congested/overloaded, the gateway device may perform congestion/overload control differentially on a UE or UEs in a UE group according to the learned information about the network access time of the UE or UE group or according to the learned information about the congestion/overload control parameter or policy of the UE group, so that congestion/overload control can be performed on the gateway device, congestion/overload caused by a large number of UEs on the gateway device is avoided, and the efficiency of congestion/overload control is improved.

BRIEF DESCRIPTION OF THE DRAWINGS

To describe the technical solutions in the embodiments of the present invention or in the prior art more clearly, the following outlines the accompanying drawings required in the description of the embodiments or the prior art. Apparently, the accompanying drawings illustrate only some exemplary embodiments of the present invention, and persons of ordinary skill in the art can derive other drawings from the accompanying drawings without creative efforts.

DETAILED DESCRIPTION OF THE EMBODIMENTS

The technical solutions provided in the embodiments of the present invention are hereinafter described clearly and completely with reference to the accompanying drawings. Apparently, the embodiments are only exemplary embodiments of the present invention and the present invention is not limited to such embodiments. Other embodiments that persons skilled in the art obtain based on the embodiments of the present invention also fall within the scope of the present invention.

Figure 1:
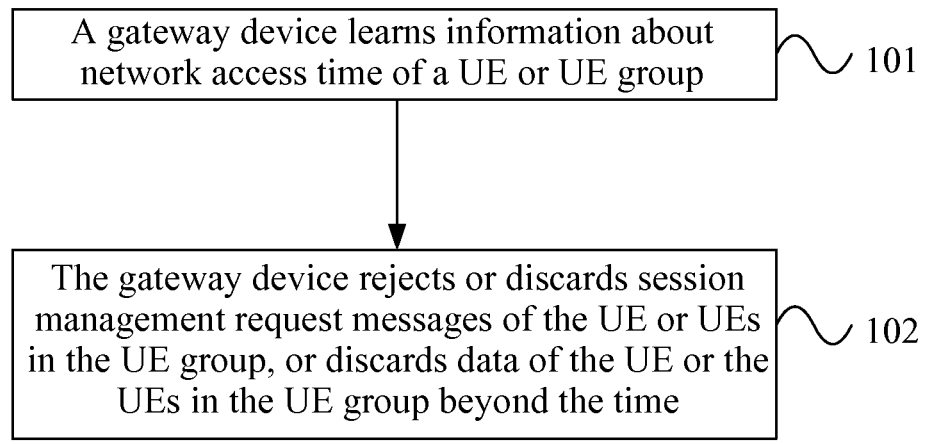
FIG. 1 is a schematic flowchart of a congestion/overload control method according to a first embodiment of the present invention.

FIG. 1 is a schematic flowchart of a congestion/overload control method according to a first embodiment of the present invention. The UE in this embodiment is a time controlled UE, and specifically, the UE can only initiate a service within the defined (subscribed or configured) time. As shown in FIG. 1, the congestion/overload control method in this embodiment may include the following steps:

Step 101: A gateway device learns information about network access time of a UE or UE group (such as authorized/allowed/access grant time periods).

Step 102: The gateway device rejects or discards session management request messages of the UE or UEs in the UE group beyond the network access time of the UE or UE group; or the gateway device discards data of the UE or the UEs in the UE group beyond the network access time of the UE or UE group.

By using the congestion/overload control method provided in this embodiment, when the gateway device is congested/overloaded, the gateway device may perform congestion/overload control differentially on the UE or UEs in the UE group according to the learned information about the network access time of the UE or UE group, so that congestion/overload control can be performed on the gateway device, congestion/overload caused by a large number of UEs on the gateway device is avoided, and the efficiency of congestion/overload control is improved.

In step 101 of this embodiment, the gateway device may learn the information about the network access time of the UE or UE group in the following modes:

A. Learn the information about the network access time of the UE or UE group from a mobility management element.

Specifically, after learning the information about the network access time of the UE or UE group, the mobility management element may send the time information to the gateway device through a session management message, for example, Create PDP Context Request message, or Create Session Request message. The mobility management element may learn the time information in the following modes:

a. Learn the information about the network access time of the UE or UE group from a subscription profile repository.

After receiving an access request message sent by the UE, the mobility management element may learn subscription data of the UE or UE group from the subscription profile repository such as a Home Location Register (Home Location Register, HLR) or a Home Subscriber Server (Home Subscriber Server, HSS), where the subscription data includes the information about the network access time of the UE or information about the network access time of the UE group. The specific mode may be: the mobility management element sends an Update Location Request message to the subscription profile repository; after receiving the Update Location Request message, the subscription profile repository returns the information about the network access time of the UE or UE group in the subscription data to the mobility management element through an Update Location Ack message.

The access request message may be an Attach Request message, a Routing Area Update Request message, a Tracking Area Update Request message, a Service Request message, a Packet Data Network (PDN) Connectivity Request message, or an Activate PDP Context Request message.

b. Learn the information about the network access time of the UE or UE group from UE contexts.

Specifically, if UE contexts are stored on the mobility management element, the mobility management element may also learn the information about the network access time of the UE or UE group from the UE contexts.

c. Learn the information about the network access time of the UE or UE group from configuration information.

The mobility management element may configure the information about the network access time of the UE or UE group according to an ID of the UE group (referred to as a group ID), and learn information about the network access time of the UE or UE group from the configuration information. The group ID is used to identify a group, and the group may be a UE group, a Machine to Machine (Machine to Machine, M2M) MTC user, an M2M application subscriber (an MTC subscriber or an MTC server), or other groups consisting of multiple devices, which is not limited in this embodiment. The group ID above may be a UE group ID, or an ID shared by multiple UEs in a group, for example, an International Mobile Subscriber Identification Number (International Mobile Subscriber Identification Number, IMSI), a Mobile Station International Integrated Services Digital Network Number (Mobile Station International Integrated Services Digital Network Number, MSISDN), or an International Mobile Equipment Identity (International Mobile Equipment Identity, IMEI), or may also be an IMSI segment or an MSISDN segment, or may also be other IDs that can indicate a group, for example, an Access Point Name (Access Point Name, APN). This embodiment does not limit the form of the group ID.

B. Learn the information about the network access time of the UE or UE group from configuration information.

The gateway device may configure the information about the network access time of the UE or UE group according to an ID of the UE group (referred to as a group ID), and learn the information about the network access time of the UE or UE group from the configuration information. Specifically, the gateway device may learn the UE ID or UE group ID through a session management message sent by the mobility management element, for example, Create PDP Context Request message, or Create Session Request message, and learn the information about the network access time of the UE or UE group from the configuration information according to the UE ID or UE group ID.

C. Learn the information about the network access time of the UE or UE group from a database.

Specifically, the gateway device may learn the UE ID or UE group ID through a session management message sent by the mobility management element, for example, Create PDP Context Request message, or Create Session Request message, and query a database such as an Authentication, Authorization and Accounting (Authentication, Authorization and Accounting, AAA) server for the information about the network access time of the UE or UE group according to the UE ID or UE group ID.

In step 102 of this embodiment, the gateway device in the congested/overloaded state may perform congestion/overload control in the following modes according to the learned information about the network access time of the UE or UE group:

A. Beyond the network access time of the UE, reject or discard the session management request message of the UE.

Specifically, when the gateway device is in the congested/overloaded state, if beyond the network access time of the UE (for example, beyond the time range identified by the information about the network access time of the UE), the gateway device receives a session management request message sent by the mobility management element for the UE, for example, Create PDP Context Request message, Create Session Request message, or Modify Bearer Request message, the gateway device rejects or discards the session management request message. Optionally, the gateway device may accept or reject or discard the session management request message according to indication information indicating whether to allow accepting the session management request of the UE beyond the network access time of the UE. For example, if the indication information indicates that the session management request of the UE is not allowed to be accepted beyond the network access time of the UE, the gateway device rejects or discards the session management request message of the UE beyond the network access time of the UE.

The indication information indicating whether to allow accepting the session management request of the UE beyond the network access time of the UE may be configured on the gateway device. For example, after receiving the session management request message sent by the mobility management element, the gateway device queries the configuration information according to the UE ID in the session management request message, and learns the indication information indicating whether to allow accepting the session management request of the UE beyond the network access time of the UE. Alternatively, the indication information indicating whether to allow accepting the session management request of the UE beyond the network access time of the UE may be defined in the subscription data. For example, the mobility management element learns from the subscription data the indication information indicating whether to allow accepting the session management request of the UE beyond the network access time of the UE, and then sends the indication information indicating whether to allow accepting the session management request of the UE beyond the network access time of the UE to the gateway device through a session management request message.

Optionally, the gateway device may also carry time indication information (called first time indication information) (back-off time) (for example, duration or time point) and/or a cause value in a session management reject message returned to the mobility management element. After receiving the first time indication information and/or cause value, the mobility management element may perform the following processing:

1. The mobility management element sends the first time indication information and/or cause value to the UE (for example, the mobility management element sends the first time indication information and/or cause value to the UE through an access request reject message). Or 2. The mobility management element generates time indication information (called second time indication information) and/or cause value information according to the received first time indication information and/or cause value, and sends the generated second time indication information and/or cause value information to the UE. For example, after learning the first time indication information sent by the gateway device, the mobility management element receives an access request sent by the UE, subtracts the time of receiving the access request sent by the UE from the first time indication information, and uses the obtained result as the value of the second time indication information. Or 3. The mobility management element performs access control (for example, rejects or discards the access request message of the UE) according to the first time indication information and/or cause value. Specifically, the first time indication information may be used to instruct the mobility management element to reject or discard the access request message of the UE within the time range indicated by the first time indication information (for example, before the first time indication information expires); or the first time indication information may be used to instruct the mobility management element to accept the access request message of the UE beyond the time range indicated by the first time indication information (for example, after the first time indication information expires); the cause value may be used to notify the mobility management element that the gateway device is in the congested/overloaded state. Or 4. The mobility management element performs access control according to the first time indication information and/or cause value (described in 3), and sends the first time indication information and/or cause value to the UE (for example, the mobility management element sends the first time indication information and/or cause value to the UE through an access request reject message).

In addition, after receiving the session reject request message of the gateway device, the mobility management element may generate (provide) the second time indication information and/or cause value information, and send the second time indication information and/or cause value information to the UE (for example, the mobility management element sends the second time indication information and/or cause value information to the UE through an access request reject message). For example, the mobility management element generates second time indication information and/or cause value information according to configuration information (the value of the second time indication information configured on the mobility management element).

The second time indication information sent by the mobility management element to the UE is used to instruct the UE not to initiate an access request frequently or immediately. Specifically, the second time indication information may be used to instruct the UE not to send an access request message within the time range indicated by the second time indication information (for example, before the second time indication information expires); or the second time indication information may also be used to instruct the UE to send an access request message beyond the time range indicated by the second time indication information (for example, after the second time indication information expires); the cause value information may be further used to instruct the UE not to send an access request message frequently or immediately. According to the second time indication information and/or cause value information sent by the mobility management element to the UE, the UE will not initiate an access request frequently or immediately, which reduces the frequent and repeated signaling impact caused by a large number of UEs on the network, and avoids network congestion or overload caused by the impact of a large amount of signaling.

B. Beyond the network access time of the UE group, reject or discard the session management request message of UEs in the UE group.

Specifically, when the gateway device is in the congested/overloaded state, if beyond the network access time of the UEs in the UE group (for example, beyond the time range identified by the information about the network access time of the UE group), the gateway device receives the session management request message sent by the mobility management element for the UEs in the UE group, for example, Create PDP Context Request message, Create Session Request message, or Modify Bearer Request message, the gateway device rejects or discards the session management request message. Optionally, the gateway device may accept or reject or discard the session management request message according to the indication information indicating whether to allow accepting the session management request of the UEs in the UE group beyond the network access time of the UE group. For example, if the indication information indicates that the session management request of the UEs in the UE group is not allowed to be accepted beyond the network access time of the UE group, the gateway device rejects or discards the session management request message of the UEs in the UE group beyond the network access time of the UE group.

The indication information indicating whether to allow accepting the session management request of the UEs in the UE group beyond the network access time of the UE group may be configured on the gateway device. For example, after receiving the session management request message sent by the mobility management element, the gateway device queries the configuration information according to the UE ID or UE group ID in the session management request message, and learns the indication information indicating whether to allow accepting the session management request of the UEs in the UE group beyond the network access time of the UE group. Alternatively, the indication information indicating whether to allow accepting the session management request of the UEs in the UE group beyond the network access time of the UE group may be defined in the subscription data. For example, the mobility management element learns from the subscription data the indication information indicating whether to allow accepting the session management request of the UEs in the UE group beyond the network access time of the UE group, and then sends the indication information indicating whether to allow accepting the session management request of the UEs in the UE group beyond the network access time of the UE group to the gateway device through a session management request message.

Further, the gateway device may reject or discard, according to a percentage, the session management request message sent by the mobility management element for the UEs in the UE group. When the gateway device is in the congested/overloaded state, if the gateway device receives the session management request message sent by the mobility management element for the UEs in the UE group beyond the network access time of the UEs in the UE group, the gateway device rejects or discards the session management request message according to the percentage.

Optionally, the gateway device may also carry time indication information (called first time indication information) (back-off time) (for example, duration or time point) and/or a cause value in a session management reject message returned to the mobility management element.

After receiving the first time indication information and/or cause value, the mobility management element may perform the following processing:

1. The mobility management element sends the first time indication information and/or cause value to the UE (for example, the mobility management element sends the first time indication information and/or cause value to the UE through an access request reject message). Or 2. The mobility management element generates time indication information (called second time indication information) and/or cause value information according to the received first time indication information and/or cause value, and sends the generated second time indication information and/or cause value information to the UE. For example, after learning the first time indication information sent by the gateway device, the mobility management element receives an access request sent by the UE, subtracts the time point of receiving the access request sent by the UE from the first time indication information, and uses the obtained result as the value of the second time indication information. Or 3. The mobility management element performs access control (for example, rejects or discards the access request message of the UE) according to the first time indication information and/or cause value. Specifically, the first time indication information may be used to instruct the mobility management element to reject or discard the access request message of the UEs in the UE group within the time range indicated by the first time indication information (for example, before the first time indication information expires); or the first time indication information may be used to instruct the mobility management element to accept the access request message of the UEs in the UE group beyond the time range indicated by the first time indication information (for example, after the first time indication information expires). Or 4. The mobility management element performs access control according to the first time indication information and/or cause value (described in 3), and sends the first time indication information and/or cause value to the UE (for example, the mobility management element sends the first time indication information and/or cause value to the UE through an access request reject message).

In addition, after receiving the session reject request message of the gateway device, the mobility management element may generate (provide) the second time indication information and/or cause value information, and send the second time indication information and/or cause value information to the UE (for example, the mobility management element sends the second time indication information and/or cause value information to the UE through an access request reject message). For example, the mobility management element generates second time indication information and/or cause value information according to configuration information (the value of the second time indication information configured on the mobility management element).

The second time indication information sent by the mobility management element to the UE is used to instruct the UE not to initiate an access request frequently or immediately. Specifically, the second time indication information may be used to instruct the UEs in the UE group not to send access request messages within the time range indicated by the second time indication information (for example, before the second time indication information expires); or the second time indication information may also be used to instruct the UEs in the UE group to send access request messages beyond the time range indicated by the second time indication information (for example, after the second time indication information expires); the cause value information may be further used to instruct the UEs in the UE group not to send access request messages frequently or immediately. According to the second time indication information and/or cause value information sent by the mobility management element to the UE, the UE will not initiate an access request frequently or immediately, which reduces the frequent and repeated signaling impact caused by a large number of UEs on the network, and avoids network congestion or overload caused by the impact of a large amount of signaling.

C. Discard data of the UE or the UEs in the UE group beyond the network access time of the UE or UE group.

Specifically, when the gateway device is in the congested/overloaded state, if beyond the network access time of the UE or UEs in the UE group (for example, beyond the time range identified by the information about the network access time of the UE or UE group), the gateway device receives data of the UE or UEs in the UE group, the gateway device discards the data. For example, beyond the network access time of the UE or UEs in the UE group, the gateway device may set the bearer gate status of the UE or UEs in the UE group to closed; when the gateway device receives the data of the UE or UEs in the UE group, the gateway device may discard the data. Optionally, the gateway device may accept or discard the data of the UE or UEs in the UE group according to indication information indicating whether to allow accepting the data of the UE or UEs in the UE group beyond the network access time of the UE or UE group. For example, if the indication information indicates that the data of the UE or UEs in the UE group is not allowed to be accepted beyond the network access time of the UE or UE group, the gateway device discards the data of the UE or UEs in the UE group beyond the network access time of the UE or UE group.

The indication information indicating whether to allow accepting the data of the UE or UEs in the UE group beyond the network access time of the UE or UE group may be configured on the gateway device. For example, after receiving the session management request message sent by the mobility management element, the gateway device queries the configuration information according to the UE ID or UE group ID in the session management request message, and learns the indication information indicating whether to allow accepting the data of the UE or UEs in the UE group beyond the network access time of the UE or UE group. Or the indication information indicating whether to allow accepting the data of the UE or UEs in the UE group beyond the network access time of the UE or UE group may be defined in the subscription data. For example, the mobility management element learns from the subscription data the indication information indicating whether to allow accepting the data of the UE or UEs in the UE group beyond the network access time of the UE or UE group, and then sends the indication information indicating whether to allow accepting the data of the UE or UEs in the UE group beyond the network access time of the UE or UE group to the gateway device through a session management request message.

The congestion/overload control method in this embodiment may be applied in multiple radio access networks, for example, the Evolved UMTS (Universal Mobile Telecommunication System, UMTS) Terrestrial Radio Access Network (Evolved UMTS Terrestrial Radio Access Network, E-UTRAN), UMTS Terrestrial Radio Access Network (UMTS Terrestrial Radio Access Network, UTRAN), GSM (Global System for Mobile Communications) or EDGE (Enhanced Data rate for GSM Evolution, EDGE) Radio Access Network (GSM/EDGE Radio Access Network, GERAN), and non $3^{rd}$ Generation Partner Project ($3^{rd}$ Generation Partner Project, 3GPP) network.

The mobility management element may be a Mobility Management Entity (Mobility Management Entity, MME) in the E-UTRAN, or a Serving GPRS (General Packet Radio Service, GPRS) Supporting Node (Serving GPRS Supporting Node, SGSN) in the UTRAN/GERAN.

The gateway device may be a network element such as a Serving Gateway (Serving Gateway, S-GW), a Packet Data Network Gateway (Packet Data Network Gateway, P-GW), or a Gateway GPRS (General Packet Radio Service, GPRS) Supporting Node (Gateway GPRS Supporting Node, GGSN).

Similarly, the mobility management element in this embodiment may also perform congestion/overload control differentially on UEs in the group in a similar way, which is not further described here. When the mobility management element is congested/overloaded, the mobility management element may perform congestion/overload control differentially on a UE or UEs in a UE group according to the learned information about the network access time of the UE or UE group, so that congestion/overload control can be performed on the mobility management element, congestion/overload caused by a large number of UEs on the gateway device is avoided, and the efficiency of congestion/overload control is improved.

Figure 2:
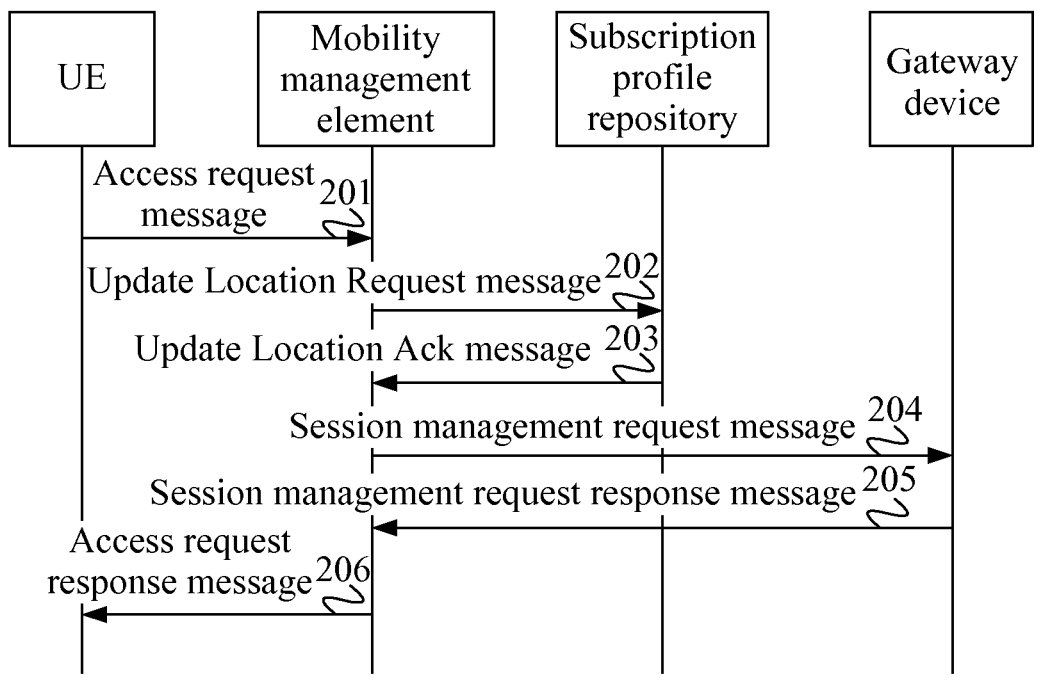
FIG. 2 is a schematic flowchart of a congestion/overload control method according to a second embodiment of the present invention.

FIG. 2 is a schematic flowchart of a congestion/overload control method according to a second embodiment of the present invention. This embodiment is a specific instance of the first embodiment. As shown in FIG. 2, the congestion/overload control method in this embodiment may include the following steps:

Step 201: A UE sends an access request message to a mobility management element.

The access request message may be an Attach Request message, a Routing Area Update Request message, a Tracking Area Update Request message, a Service Request message, a PDN Connectivity Request message, or an Activate PDP Context Request message.

Step 202: The mobility management element receives the access request message, and if the access request message is an Attach Request message, a Routing Area Update Request message, or a Tracking Area Update Request message, sends an Update Location Request message to a subscription profile repository.

Step 203: The subscription profile repository receives the Update Location Request message, and returns an Update Location Ack message to the mobility management element, where the Update Location Ack message may carry information about the network access time of the UE or UE group.

Step 204: The mobility management element receives the Update Location Ack message, and sends a session management request message to the gateway device, where the session management request message may carry information about the network access time of the UE or UE group.

The information about the network access time of the UE or UE group carried in the session management request message may be learned by the mobility management element from the subscription profile repository or UE contexts, or may be configured by the mobility management element itself.

The session management request message may be a Create PDP Context Request message, a Create Session Request message, or a Modify Bearer Request message.

If the gateway device is a PGW, the mobility management element may send the session management message to the PGW through the SGW.

Step 205: The gateway device receives the session management request message, and returns a session management request response message to the mobility management element. The gateway device performs congestion/overload control according to the information about the network access time of the UE or UE group, where the information about the network access time of the UE or UE group according to which the gateway device performs congestion/overload control may be learned from the mobility management element or configured by the gateway device itself.

The session management request response message may be a Create PDP Context Response/Reject message, a Create Session Response/Reject message, or a Modify Bearer Response/Reject message.

In this step, the method for the gateway device to perform congestion/overload control is described in the first embodiment, and not further described here.

Optionally, the gateway device may carry first time indication information (back-off time) (for example, duration or time point) and/or a cause value in a session management request response message. The first time indication information and/or cause value is described in the first embodiment, and not further described here.

Step 206: The mobility management element receives the session management request response message, and returns an access request response message to the UE or UEs in the UE group.

The access request response message may be an Attach Accept/Reject message, a Routing Area Update Accept/Reject message, a Tracking Area Update Accept/Reject message, a Service Request Accept/Reject message, a PDN Connectivity Accept/Reject message, or an Active PDP Context Accept/Reject message.

Optionally, the mobility management element may carry second time indication information (back-off time) (for example, duration or time point) and/or cause value information in the access request response message. The second time indication information and/or cause value information is described in the first embodiment, and not further described here.

By using the congestion/overload control method provided in this embodiment, when the gateway device is congested/overloaded, the gateway device may perform congestion/overload control differentially on the UE or UEs in the UE group according to the learned information about the network access time of the UE or UE group, so that congestion/overload control can be performed on the gateway device, congestion/overload caused by a large number of UEs on the gateway device is avoided, and the efficiency of congestion/overload control is improved.

Figure 3:
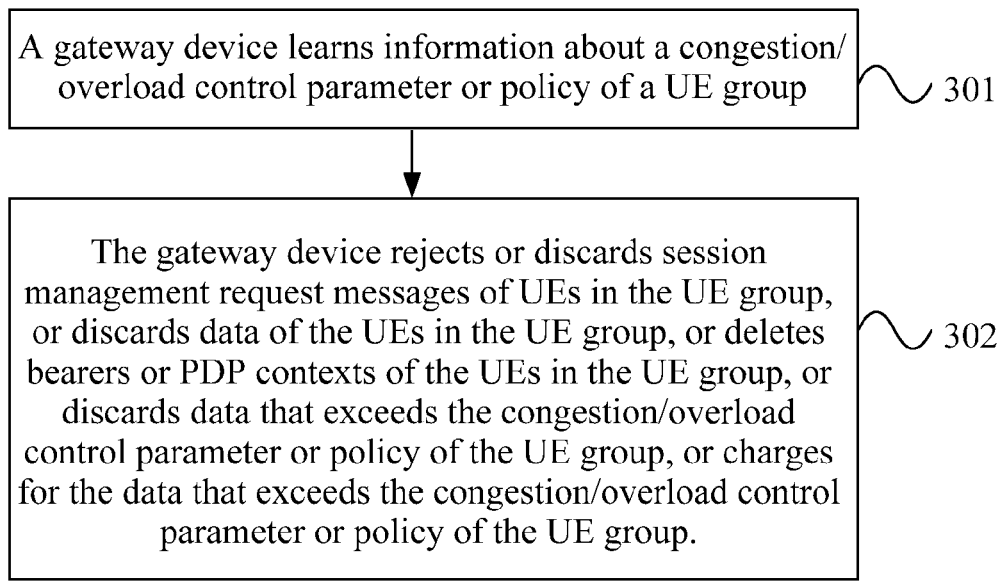
FIG. 3 is a schematic flowchart of another congestion/overload control method according to a third embodiment of the present invention.

FIG. 3 is a schematic flowchart of another congestion/overload control method according to a third embodiment of the present invention. As shown in FIG. 3, the congestion/overload control method in this embodiment may include the following steps:

Step 301: A gateway device learns information about a congestion/overload control parameter or policy of a UE group.

Step 302: If the congestion/overload control parameter or policy of the UE group is reached or exceeded, the gateway device rejects or discards session management request messages of UEs in the UE group, or discards data of the UEs in the UE group, or deletes bearers or PDP contexts of the UEs in the UE group, or discards data that exceeds the congestion/overload control parameter or policy of the UE group, or charges for the data that exceeds the congestion/overload control parameter or policy of the UE group.

By using the congestion/overload control method provided in this embodiment, when the gateway device is congested/overloaded, the gateway device may perform congestion/overload control differentially on the UEs in the UE group according to the learned information about the congestion/overload control parameter or policy of the UE group, so that congestion/overload control can be performed on the gateway device, congestion/overload caused by a large number of UEs on the gateway device is avoided, and the efficiency of congestion/overload control is improved.

The information about the congestion/overload control parameter or policy of the UE group learned by the gateway device may include at least one of the following parameters or policies:

maximum number of bearers or PDP contexts of the UE group;

maximum access rate of the UE group;

Aggregate Maximum Bit Rate (AMBR) of bearers of the UE group;

AMBR of Non Guaranteed Bit Rate (GBR) bearers of the UE group;

AMBR of bearers of the UE group in the same APN; and

AMBR of non-GBR bearers of the UE group in the same APN.

In step 301 of this embodiment, the gateway device may learn the information about the congestion/overload control parameter or policy of the UE group in the following modes:

A. Learn the information about the congestion/overload control parameter or policy of the UE group from a mobility management element.

Specifically, after learning the information about the congestion/overload control parameter or policy of the UE group, the mobility management element may send the information about the congestion/overload control parameter or policy to the gateway device through a session management message, for example, Create PDP Context Request message, or Create Session Request message. The mobility management element may learn the information about the congestion/overload control parameter or policy in the following modes:

a. Learn the information about the congestion/overload control parameter or policy of the UE group from a subscription profile repository.

After receiving an access request message that is sent by the UE and carries a UE ID or UE group ID, the mobility management element may learn subscription data of the UE group from the subscription profile repository such as a Home Location Register (Home Location Register, HLR) or a Home Subscriber Server (Home Subscriber Server, HSS) according to the UE ID or UE group ID, where the subscription data includes the information about the congestion/overload control parameter or policy of the UE group. The specific mode may be: the mobility management element sends an Update Location Request message to the subscription profile repository; after receiving the Update Location Request message, the subscription profile repository returns the information about the congestion/overload control parameter or policy of the UE group in the subscription data to the mobility management element through an Update Location Ack message.

The access request message may be an Attach Request message, a Routing Area Update Request message, a Tracking Area Update Request message, a Service Request message, a PDN Connectivity Request message, or an Activate PDP Context Request message.

b. Learn the information about the congestion/overload control parameter or policy of the UE group from UE contexts.

Specifically, if UE contexts are stored on the mobility management element, the mobility management element may also learn the information about the congestion/overload control parameter or policy of the UE group from the UE contexts.

c. Learn the information about the congestion/overload control parameter or policy of the UE group from configuration information.

The mobility management element may configure the information about the congestion/overload control parameter or policy of the UE group according to an ID of the UE group (referred to as a group ID), and learn the information about the congestion/overload control parameter or policy of the UE group from the configuration information. The group ID is used to identify a group, and the group may be a UE group, a Machine to Machine (Machine to Machine, M2M) MTC user, an M2M application subscriber (an MTC subscriber or an MTC server), or other groups consisting of multiple devices, which is not limited in this embodiment. The group ID above may be a UE group ID, or an ID shared by multiple UEs in a group, for example, an International Mobile Subscriber Identification Number (International Mobile Subscriber Identification Number, IMSI), a Mobile Station International Integrated Services Digital Network Number (Mobile Station International Integrated Services Digital Network Number, MSISDN), or an International Mobile Equipment Identity (International Mobile Equipment Identity, IMEI), or may also be an IMSI segment or an MSISDN segment, or may also be other IDs that can indicate a group, for example, an Access Point Name (Access Point Name, APN). This embodiment does not limit the form of the group ID.

B. Learn the information about the congestion/overload control parameter or policy of the UE group from configuration information.

The gateway device may configure the information about the congestion/overload control parameter or policy of the UE group according to an ID of the UE group (referred to as a group ID), and learn the information about the congestion/overload control parameter or policy of the UE group from the configuration information. Specifically, the gateway device may learn the UE ID or UE group ID through a session management message sent by the mobility management element, for example, Create PDP Context Request message, or Create Session Request message, and learn the information about the congestion/overload control parameter or policy of the UE group from the configuration information according to the UE ID or UE group ID.

C. Learn the information about the congestion/overload control parameter or policy of the UE group from a database.

The gateway device may learn the UE ID or UE group ID through a session management message sent by the mobility management element, for example, Create PDP Context Request message, or Create Session Request message, and query a database such as an Authentication, Authorization and Accounting (Authentication, Authorization and Accounting, AAA) server for the information about the congestion/overload control parameter or policy of the UE group according to the UE ID or UE group ID.

In step 302 of this embodiment, if the number of bearers or PDP contexts of the UE group reaches or exceeds the maximum number of bearers or PDP contexts of the UE group, the gateway device may perform congestion/overload control in the following modes:

A. Reject or discard session management request messages of UEs in the UE group.

Specifically, when the gateway device is in the congested/overloaded state, if the gateway device receives the session management request message sent by the mobility management element for the UEs in the UE group, for example, Create PDP Context Request message, Create Session Request message, or Modify Bearer Request message, the gateway device rejects or discards the session management request message. Optionally, the gateway device may accept or reject or discard the session management request message according to indication information indicating whether the number of bearers or PDP contexts of the UE group is allowed to reach or exceed the maximum number of bearers or PDP contexts of the UE group. For example, if the indication information indicates that the number of bearers or PDP contexts of the UE group is not allowed to reach or exceed the maximum number of bearers or PDP contexts of the UE group, the gateway device rejects or discards the session management request message of the UEs in the group.

The indication information indicating whether the number of bearers or PDP contexts of the UE group is allowed to reach or exceed the maximum number of bearers or PDP contexts of the UE group may be configured on the gateway device. For example, after receiving the session management request message sent by the mobility management element, the gateway device queries the configuration information according to the UE ID or UE group ID in the session management request message, and learns the indication information indicating whether the number of bearers or PDP contexts of the UE group is allowed to reach or exceed the maximum number of bearers or PDP contexts of the UE group. Or the indication information indicating whether the number of bearers or PDP contexts of the UE group is allowed to reach or exceed the maximum number of bearers or PDP contexts of the UE group may be defined in the subscription data. For example, the mobility management element learns from the subscription data the indication information indicating whether the number of bearers or PDP contexts of the UE group is allowed to reach or exceed the maximum number of bearers or PDP contexts of the UE group, and then sends the indication information indicating whether the number of bearers or PDP contexts of the UE group is allowed to reach or exceed the maximum number of bearers or PDP contexts of the UE group to the gateway device through a session management request message.

Further, the gateway device may reject or discard, according to a percentage, the session management request message sent by the mobility management element for the UEs in the UE group. If the number of bearers or PDP contexts of the UE group reaches or exceeds the maximum number of bearers or PDP contexts of the UE group, the gateway device receives the session management request message sent by the mobility management element for the UEs in the UE group, and rejects or discards the session management request message according to the percentage.

Optionally, the gateway device may also carry time indication information (called first time indication information) (back-off time) (for example, duration or time point) and/or a cause value in a session management reject message returned to the mobility management element.

After receiving the first time indication information and/or cause value, the mobility management element may perform the following processing:

1. The mobility management element sends the first time indication information and/or cause value to the UE (for example, the mobility management element sends the first time indication information and/or cause value to the UE through an access request reject message). Or 2. The mobility management element generates time indication information (called second time indication information) and/or cause value information according to the received first time indication information and/or cause value, and sends the generated second time indication information and/or cause value information to the UE. For example, after learning the first time indication information sent by the gateway device, the mobility management element receives an access request sent by the UE, subtracts the time point of receiving the access request sent by the UE from the first time indication information, and uses the obtained result as the value of the second time indication information. Or 3. The mobility management element performs access control (for example, rejects or discards the access request message of the UE) according to the first time indication information and/or cause value. Specifically, the first time indication information may be used to instruct the mobility management element to reject or discard the access request message of the UEs in the UE group within the time range indicated by the first time indication information (for example, before the first time indication information expires); or the first time indication information may be used to instruct the mobility management element to accept the access request message of the UEs in the UE group beyond the time range indicated by the first time indication information (for example, after the first time indication information expires); the cause value may be used to notify the mobility management element that the gateway device is in the congested/overloaded state. Or 4. The mobility management element performs access control according to the first time indication information and/or cause value (described in 3), and sends the first time indication information and/or cause value to the UE (for example, the mobility management element sends the first time indication information and/or cause value to the UE through an access request reject message).

In addition, after receiving the session reject request message of the gateway device, the mobility management element may generate (provide) the second time indication information and/or cause value information, and send the second time indication information and/or cause value information to the UE (for example, the mobility management element sends the second time indication information and/or cause value information to the UE through an access request reject message). For example, the mobility management element generates second time indication information and/or cause value information according to configuration information (the value of the second time indication information configured on the mobility management element).

The second time indication information sent by the mobility management element to the UE is used to instruct the UE not to initiate an access request frequently or immediately. Specifically, the second time indication information may be used to instruct the UEs in the UE group not to send access request messages within the time range indicated by the second time indication information (for example, before the second time indication information expires); or the second time indication information may also be used to instruct the UEs in the UE group to send access request messages beyond the time range indicated by the second time indication information (for example, after the second time indication information expires); the cause value information may be further used to instruct the UEs in the UE group not to send access request messages frequently or immediately. According to the second time indication information and/or cause value information sent by the mobility management element to the UE, the UE will not initiate an access request frequently or immediately, which reduces the frequent and repeated signaling impact caused by a large number of UEs on the network, and avoids network congestion or overload caused by the impact of a large amount of signaling.

B. Discard data of the UEs in the UE group.

Specifically, when the gateway device is in the congested/overloaded state, if the gateway device receives the data of the UEs in the UE group, the gateway device discards the data. For example, the gateway device may set the bearer gate status of the UEs in the UE group to closed; when the gateway device receives the data of the UEs in the UE group, the gateway device may discard the data. Optionally, the gateway device may discard the data of the UEs in the UE group according to the indication information indicating whether the number of bearers or PDP contexts of the UE group is allowed to reach or exceed the maximum number of bearers or PDP contexts of the UE group. For example, if the indication information indicates that the number of bearers or PDP contexts of the UE group is not allowed to reach or exceed the maximum number of bearers or PDP contexts of the UE group, the gateway device discards the data of the UEs in the UE group. The method for the gateway device to learn the indication information indicating whether the number of bearers or PDP contexts of the UE group is allowed to reach or exceed the maximum number of bearers or PDP contexts of the UE group is described in A.

C. Delete bearers or PDP contexts of the UEs in the UE group.

Specifically, the gateway device may initiate a bearer deletion procedure to delete the bearers or PDP contexts of the UEs in the UE group. Optionally, the gateway device may discard the data of the UEs in the UE group according to the indication information indicating whether the number of bearers or PDP contexts of the UE group is allowed to reach or exceed the maximum number of bearers or PDP contexts of the UE group. For example, if the indication information indicates that the number of bearers or PDP contexts of the UE group is not allowed to reach or exceed the maximum number of bearers or PDP contexts of the UE group, the gateway device deletes the bearers or PDP contexts of the UEs in the UE group. The method for the gateway device to learn the indication information indicating whether the number of bearers or PDP contexts of the UE group is allowed to reach or exceed the maximum number of bearers or PDP contexts of the UE group is described in A.

In step 302 of this embodiment, if the access rate of the UE group (rate of sending access requests by the UEs in the UE group, for example, the rate of sending Attach Requests, PDN Connectivity Requests, or Activate PDP Context Requests by the UEs in the UE group) reaches or exceeds the maximum access rate of the UE group (the maximum rate of sending access requests by the UEs in the UE group, for example, the maximum rate of sending Attach Requests, PDN Connectivity Requests, or Activate PDP Context Requests by the UEs in the UE group), the gateway device may perform congestion/overload control in the following modes:

A. Reject or discard session management request messages of the UEs in the UE group.

Specifically, when the gateway device is in the congested/overloaded state, if the gateway device receives the session management request message sent by the mobility management element for the UEs in the UE group, for example, Create PDP Context Request message, Create Session Request message, or Modify Bearer Request message, the gateway device rejects or discards the session management request message. Optionally, the gateway device may accept or reject or discard the session management request message according to indication information indicating whether the access rate of the UE group is allowed to reach or exceed the maximum access rate of the UE group. For example, if the indication information indicates the access rate of the UE group is not allowed to reach or exceed the maximum access rate of the UE group, the gateway device rejects or discards the session management request message of the UEs in the UE group.

The indication information indicating whether the access rate of the UE group is allowed to reach or exceed the maximum access rate of the UE group may be configured on the gateway device. For example, after receiving the session management request message sent by the mobility management element, the gateway device queries the configuration information according to the UE ID or UE group ID in the session management request message, and learns the indication information indicating whether the access rate of the UE group is allowed to reach or exceed the maximum access rate of the UE group. Or the indication information indicating whether the access rate of the UE group is allowed to reach or exceed the maximum access rate of the UE group may be defined in the subscription data. For example, the mobility management element learns from the subscription data the indication information indicating whether the access rate of the UE group is allowed to reach or exceed the maximum access rate of the UE group, and then sends the indication information indicating whether the access rate of the UE group is allowed to reach or exceed the maximum access rate of the UE group to the gateway device through a session management request message.

Further, the gateway device may reject or discard, according to a percentage, the session management request message sent by the mobility management element for the UEs in the UE group. If the access rate of the UE group reaches or exceeds the maximum access rate of the UE group, the gateway device receives the session management request message sent by the mobility management element for the UEs in the UE group, and rejects or discards the session management request message according to the percentage.

Optionally, the gateway device may also carry time indication information (called first time indication information) (back-off time) (for example, duration or time point) and/or a cause value in a session management reject message returned to the mobility management element.

After receiving the first time indication information and/or cause value, the mobility management element may perform the following processing:

1. The mobility management element sends the first time indication information and/or cause value to the UE (for example, the mobility management element sends the first time indication information and/or cause value to the UE through an access request reject message). Or 2. The mobility management element generates time indication information (called second time indication information) and/or cause value information according to the received first time indication information and/or cause value, and sends the generated second time indication information and/or cause value information to the UE. For example, after learning the first time indication information sent by the gateway device, the mobility management element receives an access request sent by the UE, subtracts the time point of receiving the access request sent by the UE from the first time indication information, and uses the obtained result as the value of the second time indication information. Or 3. The mobility management element performs access control (for example, rejects or discards the access request message of the UE) according to the first time indication information and/or cause value. Specifically, the first time indication information may be used to instruct the mobility management element to reject or discard the access request message of the UEs in the UE group within the time range indicated by the first time indication information (for example, before the first time indication information expires); or the first time indication information may be used to instruct the mobility management element to accept the access request message of the UEs in the UE group beyond the time range indicated by the first time indication information (for example, after the first time indication information expires); the cause value may be used to notify the mobility management element that the gateway device is in the congested/overloaded state. Or 4. The mobility management element performs access control according to the first time indication information and/or cause value (described in 3), and sends the first time indication information and/or cause value to the UE (for example, the mobility management element sends the first time indication information and/or cause value to the UE through an access request reject message).

In addition, after receiving the session reject request message of the gateway device, the mobility management element may generate (provide) the second time indication information and/or cause value information, and send the second time indication information and/or cause value information to the UE (for example, the mobility management element sends the second time indication information and/or cause value information to the UE through an access request reject message). For example, the mobility management element generates second time indication information and/or cause value information according to configuration information (the value of the second time indication information configured on the mobility management element).

The second time indication information sent by the mobility management element to the UE is used to instruct the UE not to initiate an access request frequently or immediately. Specifically, the second time indication information may be used to instruct the UEs in the UE group not to send access request messages within the time range indicated by the second time indication information (for example, before the second time indication information expires); or the second time indication information may also be used to instruct the UEs in the UE group to send access request messages beyond the time range indicated by the second time indication information (for example, after the second time indication information expires); the cause value information may be further used to instruct the UEs in the UE group not to send access request messages frequently or immediately. According to the second time indication information and/or cause value information sent by the mobility management element to the UE, the UE will not initiate an access request frequently or immediately, which reduces the frequent and repeated signaling impact caused by a large number of UEs on the network, and avoids network congestion or overload caused by the impact of a large amount of signaling.

B. Discard data of the UEs in the UE group.

Specifically, when the gateway device is in the congested/overloaded state, if the gateway device receives the data of the UEs in the UE group, the gateway device discards the data. For example, the gateway device may set the bearer gate status of the UEs in the UE group to closed; when the gateway device receives the data of the UEs in the UE group, the gateway device may discard the data.

In step 302 of this embodiment, the gateway device limits the total bandwidth (aggregate bit rate) of bearers of the UE group according to the AMBR of bearers of the UE group, or limits the total bandwidth of non-GBR bearers of the UE group according to the AMBR of non-GBR bearers of the UE group, or limits the total bandwidth of bearers of the UE group in the same APN according to the AMBR of bearers of the UE group in the same APN, or limits the total bandwidth (aggregate bit rate) of non-GBR bearers of the UE group in the same APN according to the AMBR of non-GBR bearers of the UE group in the same APN (Group-APN-AMBR). If the total bandwidth (bit rate) of bearers of the UE group reaches or exceeds the AMBR of the bearers of the UE group, or if the total bandwidth of non-GBR bearers of the UE group reaches or exceeds the AMBR of non-GBR bearers of the UE group, or if the total bandwidth of bearers of the UE group in the same APN reaches or exceeds the AMBR of bearers of the UE group in the same APN, or if the total bandwidth of non-GBR bearers of the UE group in the same APN reaches or exceeds the AMBR of non-GBR bearers of the UE group in the same APN, the gateway device may perform congestion/overload control in the following modes:

A. Discard the data that exceeds the AMBR; or

B. Charge for the data that exceeds the AMBR.

The congestion/overload control method in this embodiment may be applied in multiple radio access networks, for example, the Evolved UMTS (Universal Mobile Telecommunication System, UMTS) Terrestrial Radio Access Network (Evolved UMTS Terrestrial Radio Access Network, E-UTRAN), UMTS Terrestrial Radio Access Network (UMTS Terrestrial Radio Access Network, UTRAN), GSM (Global System for Mobile Communications) or EDGE (Enhanced Data rate for GSM Evolution, EDGE) Radio Access Network (GSM/EDGE Radio Access Network, GERAN), and non $3^{rd}$ Generation Partner Project ($3^{rd}$ Generation Partner Project, 3GPP) network.

The mobility management element may be a Mobility Management Entity (Mobility Management Entity, MME) in the E-UTRAN, or a Serving GPRS (General Packet Radio Service, GPRS) Supporting Node (Serving GPRS Supporting Node, SGSN) in the UTRAN/GERAN.

The gateway device may be a network element such as a Serving Gateway (Serving Gateway, S-GW), a Packet Data Network Gateway (Packet Data Network Gateway, P-GW), or a Gateway GPRS (General Packet Radio Service, GPRS) Supporting Node (Gateway GPRS Supporting Node, GGSN).

Similarly, the mobility management element in this embodiment may also perform congestion/overload control differentially on UEs in the group in a similar way; the only difference is: the information about the congestion/overload control parameter or policy of the UE group learned by the mobility management element may at least include the maximum number of bearers or PDP contexts of the UE group and/or the maximum access rate of the UE group, which is not further described here. When the mobility management element is congested/overloaded, the mobility management element may perform congestion/overload control differentially on UEs in a UE group according to the learned information about the congestion/overload control parameter or policy of the UE group, so that congestion/overload control can be performed on the mobility management element, congestion/overload caused by a large number of UEs on the gateway device is avoided, and the efficiency of congestion/overload control is improved.

Figure 4:
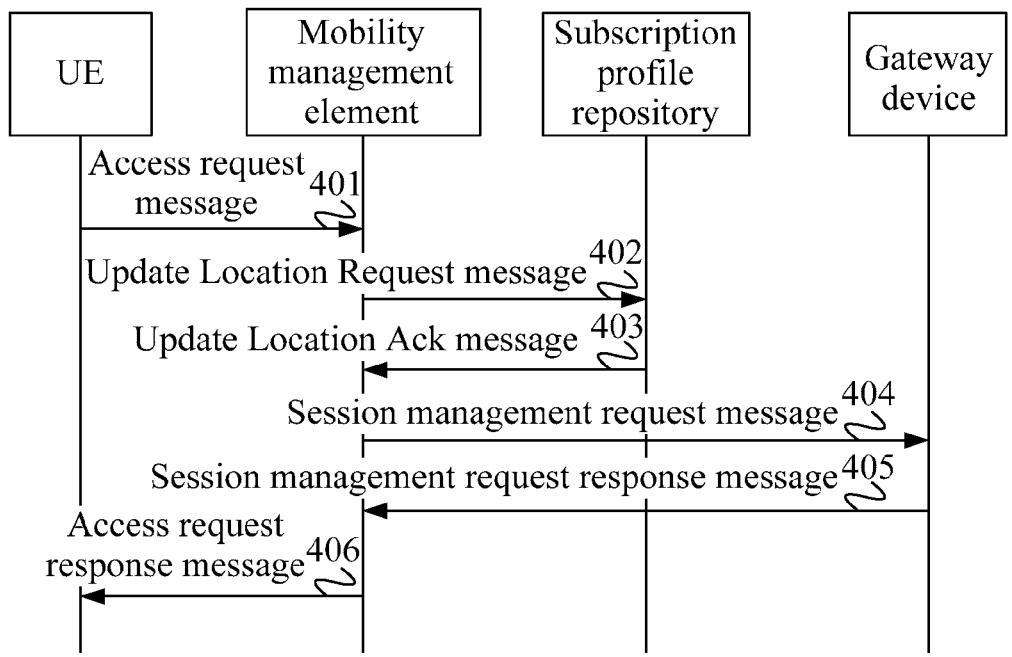
FIG. 4 is a schematic flowchart of another congestion/overload control method according to a fourth embodiment of the present invention.

FIG. 4 is a schematic flowchart of another congestion/overload control method according to a fourth embodiment of the present invention. This embodiment is a specific instance of the third embodiment. As shown in FIG. 4, the congestion/overload control method in this embodiment may include the following steps:

Step 401: A UE sends an access request message to a mobility management element.

The access request message may be an Attach Request message, a Routing Area Update Request message, a Tracking Area Update Request message, a Service Request message, a PDN Connectivity Request message, or an Activate PDP Context Request message.

Step 402: The mobility management element receives the access request message, and if the access request message is an Attach Request message, a Routing Area Update Request message, or a Tracking Area Update Request message, sends an Update Location Request message to a subscription profile repository.

Step 403: The subscription profile repository receives the Update Location Request message, and returns an Update Location Ack message to the mobility management element, where the Update Location Ack message may carry the information about the congestion/overload control parameter or policy of the UE group.

Step 404: The mobility management element receives the Update Location Ack message, and sends a session management request message to the gateway device, where the session management request message may carry the information about the congestion/overload control parameter or policy of the UE group.

The information about the congestion/overload control parameter or policy of the UE group carried in the session management request message may be learned by the mobility management element from the subscription profile repository or UE contexts, or may be configured by the mobility management element itself.

The session management request message may be a Create PDP Context Request message, a Create Session Request message, or a Modify Bearer Request message.

If the gateway device is a PGW, the mobility management element may send the session management message to the PGW through an SGW.

Step 405: The gateway device receives the session management request message, and returns a session management request response message to the mobility management element. The gateway device performs congestion/overload control according to the information about the congestion/overload control parameter or policy of the UE group, where the information about the congestion/overload control parameter or policy of the UE group according to which the gateway device performs congestion/overload control may be learned from the mobility management element or configured by the gateway device itself.

The session management request response message may be a Create PDP Context Response/Reject message, a Create Session Response/Reject message, or a Modify Bearer Response/Reject message.

In this step, the method for the gateway device to perform congestion/overload control is described in the third embodiment, and not further described here.

Optionally, the gateway device may carry first time indication information (back-off time) (for example, duration or time point) and/or a cause value in a session management request response message. The first time indication information and/or cause value is described in the third embodiment, and not further described here.

Step 406: The mobility management element receives the session management request response message, and returns an access request response message to the UE or UEs in the UE group.

The access request response message may be an Attach Accept/Reject message, a Routing Area Update Accept/Reject message, a Tracking Area Update Accept/Reject message, a Service Request Accept/Reject message, a PDN Connectivity Accept/Reject message, or an Active PDP Context Accept/Reject message.

Optionally, the mobility management element may carry second time indication information (back-off time) (for example, duration or time point) and/or cause value information in the access request response message. The second time indication information and/or cause value information is described in the first embodiment, and not further described here.

By using the congestion/overload control method provided in this embodiment, when the gateway device is congested/overloaded, the gateway device may perform congestion/overload control differentially on the UEs in the UE group according to the learned information about the congestion/overload control parameter or policy of the UE group, so that congestion/overload control can be performed on the gateway device, congestion/overload caused by a large number of UEs on the gateway device is avoided, and the efficiency of congestion/overload control is improved.

Figure 5:
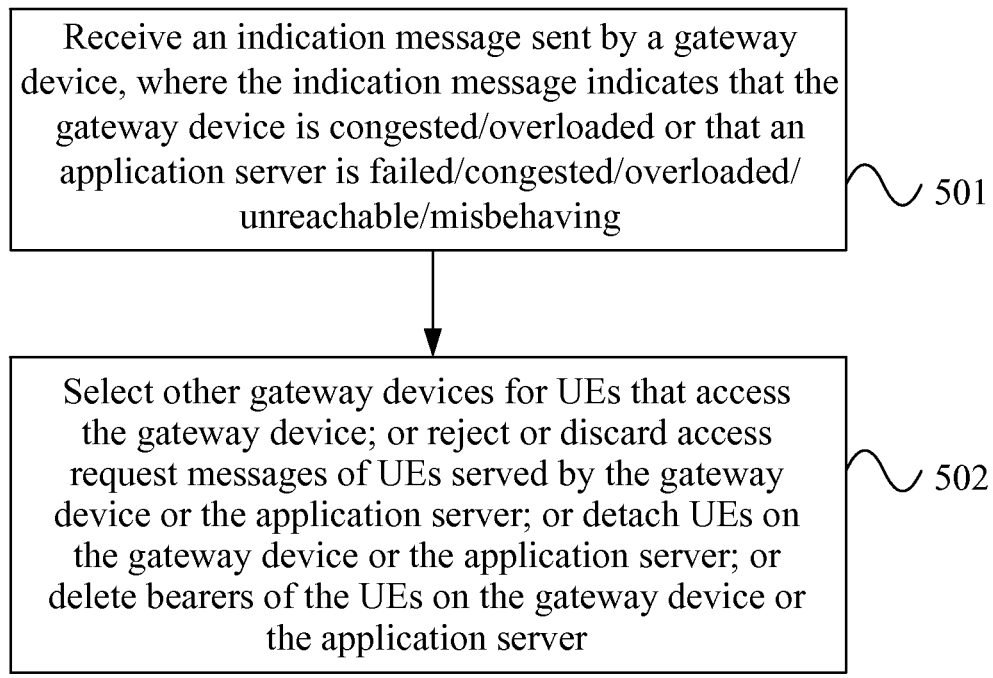
FIG. 5 is a schematic flowchart of still another congestion/overload control method according to a fifth embodiment of the present invention.

FIG. 5 is a schematic flowchart of still another congestion/overload control method according to a fifth embodiment of the present invention. As shown in FIG. 5, the congestion/overload control method in this embodiment may include the following steps:

Step 501: Receive an indication message sent by a gateway device, where the indication message indicates that the gateway device is congested/overloaded or that an application server is failed/congested/overloaded/unreachable/misbehaving.

Step 502: Select other gateway devices for UEs that access the gateway device; or reject or discard access request messages of UEs served by the gateway device or the application server; or detach UEs on the gateway device or the application server; or delete bearers of the UEs on the gateway device or the application server.

By using the congestion/overload control method provided in this embodiment, when the gateway device is congested/overloaded or the application server is failed/congested/overloaded/unreachable/misbehaving, the mobility management element may perform congestion/overload control according to the indication message sent by the gateway device, so that congestion/overload control can be performed on the gateway device, and congestion/overload caused by a large number of UEs on the gateway device is avoided.

In step 501 of this embodiment, when the gateway device is in the congested/overloaded state or the application server (MTC server) is in the failed/congested/overloaded/unreachable/misbehaving state, the gateway device sends an indication message to the mobility management element, notifying the mobility management element that the gateway device is congested/overloaded or that the application server is failed/congested/overloaded/unreachable/misbehaving, and the mobility management element performs congestion/overload control. Optionally, the indication message may carry the group ID of the group. For example, the group ID may identify the group that causes congestion/overload of the gateway device, the group served by the failed/congested/overloaded/unreachable/misbehaving application server or congested/overloaded gateway device, or the group that causes the application server to be failed/congested/overloaded/unreachable/misbehaving. The group ID is used to identify a group, and the group may be a UE group, a Machine to Machine (Machine to Machine, M2M) MTC user, an M2M application subscriber (an MTC subscriber or an MTC server), or other groups consisting of multiple devices, which is not limited in this embodiment. The group ID above may be a UE group ID, or an ID shared by multiple UEs in a group, for example, an International Mobile Subscriber Identification Number (International Mobile Subscriber Identification Number, IMSI), a Mobile Station International Integrated Services Digital Network Number (Mobile Station International Integrated Services Digital Network Number, MSISDN), or an International Mobile Equipment Identity (International Mobile Equipment Identity, IMEI), or may also be an IMSI segment or an MSISDN segment, or may also be other IDs that can indicate a group, for example, an Access Point Name (Access Point Name, APN). This embodiment does not limit the form of the group ID.

Optionally, the indication message may carry parameter information, where the parameter information includes first time indication information and/or a cause value.

Optionally, the gateway device may also perform congestion/overload control. The gateway device may discard the data of UEs in the following group: the group that causes congestion/overload of the gateway device, the group served by the failed/congested/overloaded/unreachable/misbehaving application server or congested/overloaded gateway device, or the group that causes the application server to be failed/congested/overloaded/unreachable/misbehaving. For example, the gateway device may set the bearer gate status of the UEs in the UE group to closed; when the gateway device receives the data of the UEs in the UE group, the gateway device may discard the data. The gateway device may delete the bearers of UEs in the following group: the group that causes congestion/overload of the gateway device, the group served by the failed/congested/overloaded/unreachable/misbehaving application server or congested/overloaded gateway device, or the group that causes the application server to be failed/congested/overloaded/unreachable/misbehaving. For example, the gateway device initiates a bearer deletion procedure to delete the bearers of the UEs in the group.

In step 502 of this embodiment, the mobility management element learns that the gateway device is in the congested/overloaded state or that the application server is in the failed/congested/overloaded/unreachable/misbehaving state according to the learned indication message sent by the gateway device, and may perform congestion/overload control in the following modes:

A. Select other gateway devices for UEs that access the gateway device.

Specifically, after receiving the access request message sent by the UE, the mobility management element may select other gateway devices for the UE. For example, the mobility management element learns a gateway device list for the UE according to the APN, and selects other gateway devices from the gateway device list. If the indication message sent by the gateway device in step 501 carries the group ID of the group, the mobility management element may select other gateway devices for the UEs in the group. Specifically, after receiving the access request messages that are sent by the UEs in the group and carry the UE ID or group ID, the mobility management element may select other gateway devices for the UEs. For example, the mobility management element learns a gateway device list for the UEs in the group according to the APN, and selects other gateway devices from the gateway device list. The access request message may be an Attach Request message, a Routing Area Update Request message, a Tracking Area Update Request message, a Service Request message, a PDN Connectivity Request message, or an Activate PDP Context Request message.

B. Reject or discard access request messages of UEs served by the gateway device or the application server.

Specifically, the mobility management element receives the access request message sent by a UE served by the gateway device or the application server, and rejects or discards the access request. For example, the UE carries an APN in the access request; if the APN targets the gateway device or application server, the mobility management element rejects or discards the access request of the UE. If the indication message sent by the gateway device in step 501 carries the group ID of the group, the mobility management element receives the access request message sent by the UEs in the group, and the mobility management element rejects or discards the access request message. For example, when the access request message carries a UE ID or group ID, if the UE ID belongs to (or is included in) the group ID in the indication message (namely, the UE belongs to the group identified by the group ID in the indication message), or if the group ID is the same as the group ID in the indication message, the mobility management element rejects or discards the access request message of the UE.

Further, if the indication message received by the mobility management element carries time indication information (called first time indication information) and/or a cause value, the mobility management element may perform the following processing after receiving the first time indication information and/or cause value:

1. The mobility management element sends the first time indication information and/or cause value to the UE (for example, the mobility management element sends the first time indication information and/or cause value to the UE through an access request reject message). Or 2. The mobility management element generates time indication information (called second time indication information) and/or cause value information according to the received first time indication information and/or cause value, and sends the generated second time indication information and/or cause value information to the UE. For example, after learning the first time indication information sent by the gateway device, the mobility management element receives an access request sent by the UE, subtracts the time point of receiving the access request sent by the UE from the first time indication information, and uses the obtained result as the value of the second time indication information. Or 3. The mobility management element performs access control (for example, rejects or discards the access request message of the UE) according to the first time indication information and/or cause value. Specifically, the mobility management element may reject or discard the access request message of the UE within the time range indicated by the first time indication information (for example, before the first time indication information expires); or the mobility management element may also accept the access request message of the UE beyond the time range indicated by the first time indication information (for example, after the first time indication information expires); or according to the cause value, the mobility management element may also learn that the gateway device is in the congested/overloaded state or that the application server is in the failed/congested/overloaded/unreachable/misbehaving state. Or 4. The mobility management element performs access control according to the first time indication information and/or cause value (described in 3), and sends the first time indication information and/or cause value to the UE (for example, the mobility management element sends the first time indication information and/or cause value to the UE through an access request reject message).

In addition, after receiving the session reject request message of the gateway device, the mobility management element may generate (provide) the second time indication information and/or cause value information, and send the second time indication information and/or cause value information to the UE (for example, the mobility management element sends the second time indication information and/or cause value information to the UE through an access request reject message). For example, the mobility management element generates second time indication information and/or cause value information according to configuration information (the value of the second time indication information configured on the mobility management element).

The second time indication information sent by the mobility management element to the UE is used to instruct the UE not to initiate an access request frequently or immediately. Specifically, the second time indication information may be used to instruct the UE not to send an access request message within the time range indicated by the second time indication information (for example, before the second time indication information expires); or the second time indication information is used to instruct the UE to send an access request message beyond the time range indicated by the second time indication information (for example, after the second time indication information expires); the cause value information is used to instruct the UE not to send an access request message frequently or immediately. According to the second time indication information and/or cause value information sent by the mobility management element to the UE, the UE will not initiate an access request frequently or immediately, which reduces the frequent and repeated signaling impact caused by a large number of UEs on the network, and avoids network congestion or overload caused by the impact of a large amount of signaling.

C. Detach UEs on the gateway device or the application server.

The mobility management element may initiate a detach procedure for the UE. For example, the mobility management element learns the UE to be detached according to the information about the gateway device in the UE context (for example, the address of the gateway device) or information about the application server (or information about the gateway device or application server corresponding to the UE context, for example, an APN), and initiates a detach procedure for the UE. If the indication message sent by the gateway device in step 501 carries the group ID of the group, the mobility management element learns the UEs to be detached in the group according to the group ID carried in the indication message, and initiates a detach procedure for the UEs in the group.

D. Delete bearers of the UEs on the gateway device or the application server.

The mobility management element may initiate a bearer deletion procedure for the UE. For example, the mobility management element learns the UE whose bearers need to be deleted according to the information about the gateway device in the UE context (for example, the address of the gateway device) or information about the application server (or information about the gateway device or application server corresponding to the gateway device, for example, an APN), and initiates a bearer deletion procedure for the UE. If the indication message sent by the gateway device in step 501 carries the group ID of the group, the mobility management element learns the UEs whose bearers need to be deleted in the group according to the group ID carried in the received indication message, and initiates a bearer deletion procedure for the UEs in the group.

By using the congestion/overload control method provided in this embodiment, when the gateway device is congested/overloaded or the application server is failed/congested/overloaded/unreachable/misbehaving, the mobility management element may perform congestion/overload control differentially on a UE or UEs in a group according to the indication message sent by the gateway device or the carried group ID or parameter information; further, the mobility management element may perform access control on the UE or UEs in the group within a duration according to the parameter information in the indication message, and the second time indication information and/or cause value sent by the mobility management element to the UE instructs the UE not to send an access request frequently or immediately, which reduces the frequent and repeated signaling impact caused by a large number of UEs on the network, and avoids network congestion or overload caused by the impact of a large amount of signaling. Under the control of the mobility management element, congestion/overload control can be implemented on the gateway device, the congestion/overload caused by a large number of UEs on the gateway device is avoided, and the efficiency of congestion/overload control is improved.

The congestion/overload control method in this embodiment may be applied in multiple radio access networks, for example, the Evolved UMTS (Universal Mobile Telecommunication System, UMTS) Terrestrial Radio Access Network (Evolved UMTS Terrestrial Radio Access Network, E-UTRAN), UMTS Terrestrial Radio Access Network (UMTS Terrestrial Radio Access Network, UTRAN), GSM (Global System for Mobile Communications) or EDGE (Enhanced Data rate for GSM Evolution, EDGE) Radio Access Network (GSM/EDGE Radio Access Network, GERAN), and non $3^{rd}$ Generation Partner Project ($3^{rd}$ Generation Partner Project, 3GPP) network.

The mobility management element may be a Mobility Management Entity (Mobility Management Entity, MME) in the E-UTRAN, or a Serving GPRS (General Packet Radio Service, GPRS) Supporting Node (Serving GPRS Supporting Node, SGSN) in the UTRAN/GERAN.

The gateway device may be a network element such as a Serving Gateway (Serving Gateway, S-GW), a Packet Data Network Gateway (Packet Data Network Gateway, P-GW), or a Gateway GPRS (General Packet Radio Service, GPRS) Supporting Node (Gateway GPRS Supporting Node, GGSN).

Figure 6:
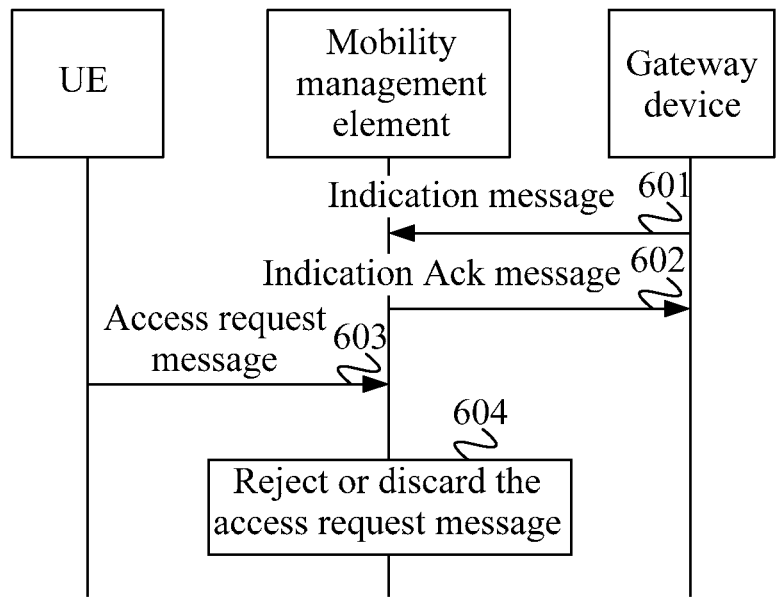
FIG. 6 is a schematic flowchart of still another congestion/overload control method according to a sixth embodiment of the present invention.

FIG. 6 is a schematic flowchart of still another congestion/overload control method according to a sixth embodiment of the present invention. This embodiment is a specific instance of the fifth embodiment. As shown in FIG. 6, the congestion/overload control method in this embodiment may include the following steps:

Step 601: A gateway device sends an indication message to a mobility management element, where the indication message is used to instruct the mobility management element to perform congestion/overload control.

Specifically, when the gateway device is in the congested/overloaded state, or the gateway device learns that the application server is in the failed/congested/overloaded/unreachable/misbehaving state, the gateway device sends an indication message to the mobility management element, instructing the mobility management element to perform congestion/overload control (for example, reject or discard the access request of the UE).

Optionally, the indication message may carry the group ID of the group, for example IDs such as an APN, IMSI segment, or MSISDN segment. The group ID may identify the group that causes congestion/overload of the gateway device, the group served by the failed/congested/overloaded/unreachable/misbehaving application server or congested/overloaded gateway device, or the group that causes the application server to be failed/congested/overloaded/unreachable/misbehaving.

Optionally, the indication message may also carry first time indication information and/or a cause value.

The first time indication information and/or cause value is described in the fifth embodiment, and not further described here.

Step 602: The mobility management element receives the indication message and returns an indication Ack message to the gateway device.

This step is optional.

Step 603: A UE sends an access request message to the mobility management element.

Step 604: The mobility management element rejects or discards the access request message.

Specifically, the mobility management element receives the access request message sent by the UE served by the gateway device or the application server, and rejects or discards the access request. For example, the UE carries an APN in the access request; if the APN targets the gateway device or application server, the mobility management element rejects or discards the access request of the UE. If the indication message sent by the gateway device in step 601 carries the group ID of the group, and if the access request message comes from the UE in the group, the mobility management element rejects or discards the access request message. For example, if the UE ID carried in the access request message belongs to (or is included in) the group ID in the indication message (namely, the UE belongs to the group identified by the group ID in the indication message), or if the group ID carried in the access request message is the same as the group ID in the indication message, the mobility management element rejects or discards the access request message. Further, the mobility management element may carry second time indication information and/or cause value information in an access request reject message sent by the UE in the group.

The second time indication information and/or cause value in this step is described in the fifth embodiment, and not further described here.

By using the congestion/overload control method provided in this embodiment, when the gateway device is congested/overloaded or the application server is failed/congested/overloaded/unreachable/misbehaving, the mobility management element may perform congestion/overload control differentially on a UE or UEs in a UE group according to the indication message sent by the gateway device, so that congestion/overload control can be performed on the gateway device, congestion/overload caused by a large number of UEs on the gateway device is avoided, and the efficiency of congestion/overload control is improved.

It should be noted that, for ease of description, the foregoing embodiments of the present invention are all described as a series of actions. Persons skilled in the art understand that the present invention is not limited to the sequence of actions described herein and that according to the present invention, some steps may be performed in other sequence or at the same time. In addition, it is understandable to persons skilled in the art that the embodiments in the specification are exemplary embodiments and that actions and modules involved in these embodiments are not mandatory for the present invention.

In the foregoing embodiments of the present invention, each embodiment has its emphasis. What is not detailed in one embodiment of the present invention is detailed in the related description of another embodiment.

Figure 7:
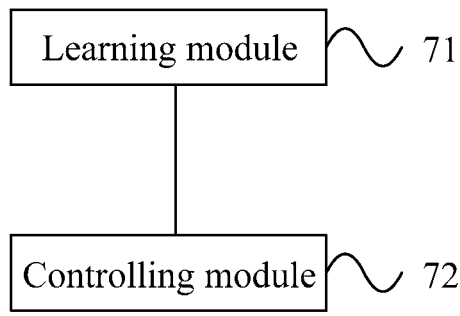
FIG. 7 is a schematic structural diagram of a gateway device according to a seventh embodiment of the present invention.

FIG. 7 is a schematic structural diagram of a gateway device according to a seventh embodiment of the present invention. As shown in FIG. 7, the gateway device in this embodiment may include a learning module 71 and a controlling module 72. The learning module 71 learns information about the network access time of a UE or UE group, and the controlling module 72 rejects or discards session management request messages of the UE or UEs in the UE group or discards data of the UE or UEs in the UE group beyond the network access time of the UE or UE group.

Both the method in the first embodiment and the function of the gateway device in the second embodiment may be implemented by the gateway device provided in this embodiment.

With the gateway device provided in this embodiment, when the gateway device is congested/overloaded, the controlling module may perform congestion/overload control differentially on the UE or UEs in the group according to the learned information about the network access time of the UE or UE group, so that congestion/overload control can be performed on the gateway device, congestion/overload caused by a large number of UEs on the gateway device is avoided, and the efficiency of congestion/overload control is improved.

Further, specifically, the learning module 71 in this embodiment may learn information about the network access time of the UE or UE group from a mobility management element through a session management message, where the information about the network access time of the UE or UE group is learned by the mobility management element from configuration information; or learn information about the network access time of the UE or UE group from a mobility management element through a session management message, where the information about the network access time of the UE or UE group is learned by the mobility management element from a subscription profile repository; or learn information about the network access time of the UE or UE group from a mobility management element through a session management message, where the information about the network access time of the UE or UE group is learned by the mobility management element from UE contexts; or learn information about the network access time of the UE or UE group from configuration information of the gateway device; or learn information about the network access time of the UE or UE group from a database.

Further, if the controlling module 72 in this embodiment rejects the session management request message of the UE or UEs in the UE group, the controlling module 72 may send a session management reject message to the mobility management element, where the session management reject message carries time indication information (called first time indication information) and/or a cause value, where:

the first time indication information is used to instruct the mobility management element to reject or discard the access request message of the UE or UEs in the UE group within the time range indicated by the first time indication information; or the first time indication information is used to instruct the mobility management element to accept the access request message of the UE or UEs in the UE group beyond the time range indicated by the first time indication information; or the cause value is used to notify the mobility management element that the gateway device is in the congested/overloaded state.

Figure 8:
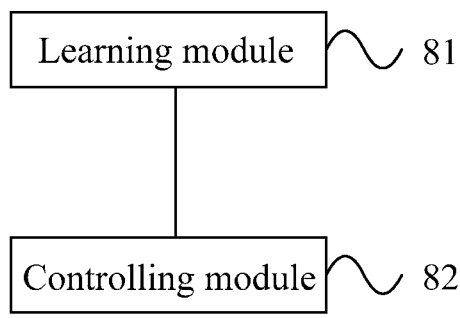
FIG. 8 is a schematic structural diagram of another gateway device according to an eighth embodiment of the present invention.

FIG. 8 is a schematic structural diagram of another gateway device according to an eighth embodiment of the present invention. As shown in FIG. 8, the gateway device in this embodiment may include a learning module 81 and a controlling module 82. The learning module 81 learns information about a congestion/overload control parameter or policy of a UE group, and when the congestion/overload control parameter or policy of the UE group is reached or exceeded, the controlling module 82 rejects or discards the session management request message of UEs in the UE group, or discards data of the UEs in the UE group, or deletes bearers or PDP contexts of the UEs in the UE group, or discards the data that exceeds the congestion/overload control parameter or policy of the UE group, or charges for the data that exceeds the congestion/overload control parameter or policy of the UE group.

Both the method in the third embodiment and the function of the gateway device in the fourth embodiment may be implemented by the gateway device provided in this embodiment.

With the gateway device provided in this embodiment, when the gateway device is congested/overloaded, the controlling module may perform congestion/overload control differentially on the UEs in the group according to the information about the congestion/overload control parameter or policy of the UE group learned by the learning module, so that congestion/overload control can be performed on the gateway device, congestion/overload caused by a large number of UEs on the gateway device is avoided, and the efficiency of congestion/overload control is improved.

Further, specifically, the learning module 81 in this embodiment may learn the information about the congestion/overload control parameter or policy of the UE group from a mobility management element through a session management message, where the information about the congestion/overload control parameter or policy of the UE group is learned by the mobility management element from configuration information; or learn the information about the congestion/overload control parameter or policy of the UE group from a mobility management element through a session management message, where the information about the congestion/overload control parameter or policy of the UE group is learned by the mobility management element from a subscription profile repository; or learn the information about the congestion/overload control parameter or policy of the UE group from a mobility management element through a session management message, where the information about the congestion/overload control parameter or policy of the UE group is learned by the mobility management element from UE contexts; or learn the information about the congestion/overload control parameter or policy of the UE group from configuration information of the gateway device; or learn the information about the congestion/overload control parameter or policy of the UE group from a database.

The information about the congestion/overload control parameter or policy of the UE group in this embodiment includes at least one of the following parameters or policies:

maximum number of bearers or PDP contexts of the UE group;

maximum access rate of the UE group;

AMBR of bearers of the UE group;

AMBR of non-GBR bearers of the UE group;

AMBR of bearers of the UE group in the same APN; and

AMBR of non-GBR bearers of the UE group in the same APN.

Further, if the number of bearers or PDP contexts of the UE group reaches or exceeds the maximum number of bearers or PDP contexts of the UE group, the controlling module 82 in this embodiment may reject or discard the session management request message of the UEs in the UE group, or discard the data of the UEs in the UE group, or delete the bearers or PDP contexts of the UEs in the UE group. For detailed description, see the related description in the third embodiment.

Further, if the access rate of the UE group reaches or exceeds the maximum access rate of the UE group, the controlling module 82 in this embodiment may reject or discard the session management request message of the UEs in the UE group, or discard the data of the UEs in the UE group. For detailed description, see the related description in the third embodiment.

Further, if the total bandwidth of bearers of the UE group reaches or exceeds the AMBR of the bearers of the UE group, or if the total bandwidth of non-GBR bearers of the UE group reaches or exceeds the AMBR of non-GBR bearers of the UE group, or if the total bandwidth of bearers of the UE group in the same APN reaches or exceeds the AMBR of bearers of the UE group in the same APN, or if the total bandwidth of non-GBR bearers of the UE group in the same APN reaches or exceeds the AMBR of non-GBR bearers of the UE group in the same APN, the controlling module 82 in this embodiment may discard the data that exceeds the AMBR or charge for the data that exceeds the AMBR.

Further, if the controlling module 82 in this embodiment rejects the session management request message of the UEs in the UE group, the controlling module 82 may send a session management reject message to the mobility management element, where the session management reject message carries time indication information (called first time indication information) and/or a cause value, where:

the first time indication information is used to instruct the mobility management element to reject or discard the access request message of the UEs in the UE group within the time range indicated by the first time indication information; or the first time indication information is used to instruct the mobility management element to accept the access request message of the UEs in the UE group beyond the time range indicated by the first time indication information; or the cause value is used to notify the mobility management element that the gateway device is in the congested/overloaded state.

Figure 9:
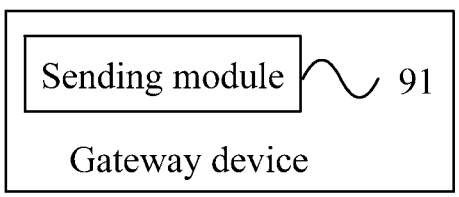
FIG. 9 is a schematic structural diagram of still another gateway device according to a ninth embodiment of the present invention.

FIG. 9 is a schematic structural diagram of still another gateway device according to a ninth embodiment of the present invention. As shown in FIG. 9, the gateway device in this embodiment may include a sending module 91 adapted to send an indication message to a mobility management element, where the indication message indicates that the gateway device is congested/overloaded or that an application server is failed/congested/overloaded/unreachable/misbehaving, so that the mobility management element selects other gateway devices for UEs that access the gateway device; or rejects or discards access request messages of UEs served by the gateway device or the application server; or detaches UEs on the gateway device or the application server; or deletes bearers of the UEs on the gateway device or the application server.

Both the method in the fifth embodiment and the function of the gateway device in the sixth embodiment may be implemented by the gateway device provided in this embodiment.

With the gateway device provided in this embodiment, when the gateway device is congested/overloaded or the application server is failed/congested/overloaded/unreachable/misbehaving, the gateway device may send an indication message to a mobility management element, so that the mobility management element performs congestion/overload control according to the indication message sent by the gateway device. In this way, congestion/overload control can be performed on the gateway device, and congestion/overload caused by a large number of UEs on the gateway device is avoided.

Figure 10:
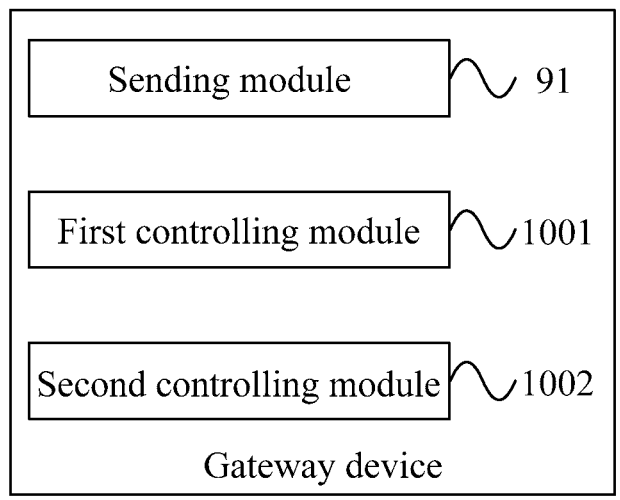
FIG. 10 is a schematic structural diagram of still another gateway device according to a tenth embodiment of the present invention.

FIG. 10 is a schematic structural diagram of still another gateway device according to a tenth embodiment of the present invention. As shown in FIG. 10, compared with the ninth embodiment, the gateway device in this embodiment may further include a first controlling module 1001 and a second controlling module 1002. The first controlling module 1001 may discard the data of UEs in the following group: the group that causes congestion/overload of the gateway device, the group served by the failed/congested/overloaded/unreachable/misbehaving application server or congested/overloaded gateway device, or the group that causes the application server to be failed/congested/overloaded/unreachable/misbehaving; the second controlling module 1002 may delete the bearers of UEs in the following group: the group that causes congestion/overload of the gateway device, the group served by the failed/congested/overloaded/unreachable/misbehaving application server or congested/overloaded gateway device, or the group that causes the application server to be failed/congested/overloaded/unreachable/misbehaving.

With the gateway device provided in this embodiment, when the gateway device is congested/overloaded or the application server is failed/congested/overloaded/unreachable/misbehaving, the gateway device may send an indication message to a mobility management element, so that the mobility management element performs congestion/overload control; or the gateway device may perform congestion/overload control by itself. In this way, congestion/overload control is further performed on the gateway device, and congestion/overload caused by a large number of UEs on the gateway device is avoided.

Figure 11:
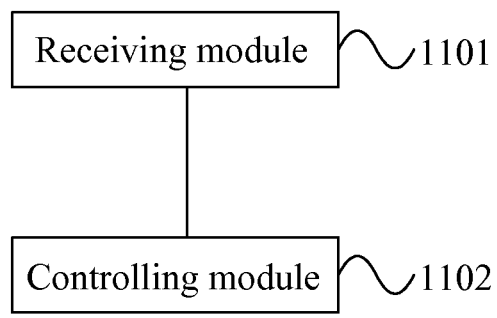
FIG. 11 is a schematic structural diagram of a mobility management element according to an eleventh embodiment of the present invention.

FIG. 11 is a schematic structural diagram of a mobility management element according to an eleventh embodiment of the present invention; as shown in FIG. 11, the mobility management element includes a receiving module 1101 and a controlling module 1102. The receiving module 1101 receives an indication message sent by a gateway device, where the indication message indicates that the gateway device is congested/overloaded or that an application server is failed/congested/overloaded/unreachable/misbehaving. The controlling module 1102 selects other gateway devices for UEs that access the gateway device; or rejects or discards access request messages of UEs served by the gateway device or the application server; or detaches UEs on the gateway device or the application server; or deletes bearers of the UEs on the gateway device or the application server.

Both the method in the fifth embodiment and the function of the mobility management element in the sixth embodiment may be implemented by the mobility management element provided in this embodiment.

With the mobility management element provided in this embodiment, when the gateway device is congested/overloaded or the application server is failed/congested/overloaded/unreachable/misbehaving, the mobility management element may perform congestion/overload control according to the indication message sent by the gateway device, so that congestion/overload control can be performed on the gateway device, and congestion/overload caused by a large number of UEs on the gateway device is avoided.

Further, if the controlling module 1102 in this embodiment rejects the access request messages of UEs served by the gateway device or the application server, the controlling module 1102 may send an access request reject message to the UEs, where the access request reject message may carry time indication information (called second time indication information), where:

the second time indication information is used to instruct the UEs in the group not to send access request messages within the time range indicated by the second time indication information; or the second time indication information is used to instruct the UEs in the group to send access request messages beyond the time range indicated by the second time indication information.

It should be noted that the congestion/overload described in the embodiments of the present invention refers to congestion or overload.

It should be noted that the embodiments of the present invention may be applied not only in the M2M communication system but also in other communication systems, for example, a Human to Human (H2H) communication system, which is not limited by the embodiments of the present invention.

It is understandable to persons skilled in the art that all or part of the steps of the methods in the foregoing embodiments can be implemented by relevant hardware instructed by a program. The program may be stored in a computer readable storage medium. When the program runs, the steps of the methods in the foregoing embodiments are executed, and the storage medium may be any medium that can store program codes, such as a Read Only Memory (ROM), a Random Access Memory (RAM), a magnetic disk and a Compact Disk-Read Only Memory (CD-ROM).

Finally, it should be noted that the embodiments of the present invention are intended for describing the technical solutions of the present invention other than limiting the present invention. Although the present invention is described in detail with reference to the foregoing embodiments, persons of ordinary skill in the art should understand that modification and substitutions can be made to the technical solutions of the present invention or some technical features thereof without departing from the spirit and scope of the present invention.

What is claimed is:

1. A congestion/overload control method, comprising:
obtaining, by a gateway device, information about a congestion/overload control parameter or policy of a User Equipment (UE) group, wherein the information about the congestion/overload control parameter or policy of the UE group comprises at least one of the following: a maximum number of bearers or Packet Data Protocol (PDP) contexts of the UE group, and a maximum access rate of the UE group; and
rejecting by the gateway device, session management request messages of UEs in the UE group upon the congestion/overload control parameter or policy of the UE group is reached or exceeded, wherein the rejection comprises sending a session management reject message carrying a first time indication information to a mobility management element that instructs the mobility management element to reject access request messages of the UEs.

2. The method according to claim 1, wherein obtaining, by the gateway device, the information about the congestion/overload control parameter or policy of the UE group, comprises at least one of the following:
obtaining, by a mobility management element connected with the gateway device, the information about the congestion/overload control parameter or policy of the UE group from configuration information, and notifying the gateway device of the information about the congestion/overload control parameter or policy of the UE group through a session management message;
obtaining, by the mobility management element, the information about the congestion/overload control parameter or policy of the UE group from a subscription profile repository, and notifying the gateway device of the information about the congestion/overload control parameter or policy of the UE group through the session management message;
obtaining, by the mobility management element, the information about the congestion/overload control parameter or policy of the UE group from UE contexts, and notifying the gateway device of the information about the congestion/overload control parameter or policy of the UE group through the session management message;
obtaining, by the gateway device, the information about the congestion/overload control parameter or policy of the UE group from configuration information of the gateway device; or
obtaining, by the gateway device, the information about the congestion/overload control parameter or policy of the UE group from a database.

3. The method according to claim 2, wherein:
the configuration information of the gateway device is information about the congestion/overload control parameter or policy of the UE group configured according to a group ID of the UE group; and
wherein obtaining, by the gateway device, the information about the congestion/overload control parameter or policy of the UE group from the configuration information of the gateway device comprises:
receiving, by the gateway device, a session management request of the UE, wherein the session management request message carries the group ID of the UE group; and
querying, by the gateway device according to the group ID of the UE group, the information about the congestion/overload control parameter or policy of the UE group configured on the gateway device.

4. The method according to claim 1, wherein:
if a quantity of the bearers or PDP contexts of the UE group reaches or exceeds the maximum number of the bearers or PDP contexts of the UE group, the session management request messages of the UEs in the UE group are rejected.

5. The method according to claim 1,
wherein rejecting the session management request messages of the UEs in the UE group comprises: sending a session management reject message to a mobility management element; and
the method further comprises: after receiving the session management reject message, sending, by the mobility management element, second time indication information to the UEs, wherein:
the second time indication information instructs the UEs in the group not to send access request messages within a time range indicated by the second time indication information.

6. The method according to claim 1, wherein:
if the access rate of the UE group reaches or exceeds the maximum access rate of the UE group, the session management request messages of the UEs in the UE group are rejected.

7. The method according to claim 5, wherein the second time indication information instructs the UEs in the group to send access request messages beyond the time range indicated by the second time indication information.

8. A gateway device, comprising:
processor, configured to obtain information about a congestion/overload control parameter or policy of a User Equipment (UE) group, wherein the information about the congestion/overload control parameter or policy of the UE group comprises at least one of the following: a maximum number of bearers or Packet Data Protocol (PDP) contexts of the UE group, and a maximum access rate of the UE group; and
a transmitter, configured to: reject session management request messages of UEs in the UE group if the congestion/overload control parameter or policy of the UE group is reached or exceeded, wherein in rejecting session management request messages of UEs in the UE group, the controlling module is configured to send a session management reject message carrying a first time indication information to a mobility management element, and the first time indication information instructs the mobility management element to reject access request messages of the UEs in the UE group within a time range indicated by the first time indication information.

9. The gateway device according to claim 8, wherein the processor is configured to implement at least one of the following:
obtaining the information about the congestion/overload control parameter or policy of the UE group from a mobility management element through a session management message, wherein the information about the congestion/overload control parameter or policy of the UE group is obtained by the mobility management element from configuration information;
obtaining the information about the congestion/overload control parameter or policy of the UE group from the mobility management element through the session management message, wherein the information about the congestion/overload control parameter or policy of the UE group is obtained by the mobility management element from a subscription profile repository;

obtaining the information about the congestion/overload control parameter or policy of the UE group from the mobility management element through the session management message, wherein the information about the congestion/overload control parameter or policy of the UE group is obtained by the mobility management element from UE contexts;

obtaining the information about the congestion/overload control parameter or policy of the UE group from configuration information of the gateway device; or obtaining the information about the congestion/overload control parameter or policy of the UE group from a database.

10. The gateway device according to claim 9, wherein:

when a quantity of the bearers or PDP contexts of the UE group reaches or exceeds the maximum number of the bearers or PDP contexts of the UE group, the transmitter is configured to:

reject the session management request messages of the UEs in the UE group;

when the access rate of the UE group reaches or exceeds the maximum access rate of the UE group, the transmitter is configured to:

reject the session management request messages of the UEs in the UE group.

11. A congestion/overload control method, comprising:

obtaining, by a gateway device, information about a congestion/overload control parameter or policy of a User Equipment (UE) group, wherein the information about the congestion/overload control parameter or policy of the UE group comprises at least one of the following: a maximum number of bearers or Packet Data Protocol (PDP) contexts of the UE group, and a maximum access rate of the UE group; and if the congestion/overload control parameter or policy of the UE group is reached or exceeded, sending, by the gateway device, a session management reject message carrying first time indication information to a mobility management element, wherein the first time indication information instructs the mobility management element to reject access request messages of the UEs in the UE group within a time range indicated by the first time indication information.

12. A congestion/overload control method, comprising:

receiving, by a mobility management element, a session management reject message carrying first time indication information from a gateway device if a congestion/overload control parameter or policy of a User Equipment (UE) group is reached or exceeded, wherein the congestion/overload control parameter or policy of the UE group comprises at least one of the following: a maximum number of bearers or Packet Data Protocol (PDP) contexts of the UE group, and a maximum access rate of the UE group;

rejecting, by the mobility management element, access request messages of the UEs in the UE group within the time range indicated by the first time indication information.

13. A mobility management element, comprising:

receiver, configured to receive a session management reject message carrying first time indication information from a gateway device when a congestion/overload control parameter or policy of a User Equipment (UE) group is reached or exceeded, wherein the congestion/overload control parameter or policy of the UE group comprises at least one of the following: a maximum number of bearers or Packet Data Protocol (PDP) contexts of the UE group, and a maximum access rate of the UE group; and processor, configured to reject access request messages of the UEs in the UE group within the time range indicated by the first time indication information.

* * * * *

UNITED STATES PATENT AND TRADEMARK OFFICE
CERTIFICATE OF CORRECTION

PATENT NO.         : 9,226,222 B2                                Page 1 of 1
APPLICATION NO.    : 13/657287
DATED              : December 29, 2015
INVENTOR(S)        : Zhou et al.

It is certified that error appears in the above-identified patent and that said Letters Patent is hereby corrected as shown below:

In the Claims

Column 36, line 24, "receiver" should read -- a receiver --.

Column 36, line 33, "processor" should read -- a processor --.

Signed and Sealed this
Twenty-second Day of March, 2016

Michelle K. Lee
*Director of the United States Patent and Trademark Office*